United States Patent
Yano

(10) Patent No.: US 11,132,385 B2
(45) Date of Patent: Sep. 28, 2021

(54) INFORMATION PROCESSING DEVICE AND INFORMATION PROCESSING METHOD

(71) Applicant: FUJITSU LIMITED, Kawasaki (JP)

(72) Inventor: Keisuke Yano, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 397 days.

(21) Appl. No.: 16/037,118

(22) Filed: Jul. 17, 2018

(65) Prior Publication Data
US 2019/0026355 A1    Jan. 24, 2019

(30) Foreign Application Priority Data
Jul. 21, 2017   (JP) .............................. JP2017-141673

(51) Int. Cl.
*G06F 16/00*    (2019.01)
*G06F 16/28*    (2019.01)
(Continued)

(52) U.S. Cl.
CPC .............. *G06F 16/285* (2019.01); *G06F 8/70* (2013.01); *G06F 8/74* (2013.01); *G06F 8/75* (2013.01);
(Continued)

(58) Field of Classification Search
CPC .. G06F 16/9027; G06F 16/322; G06F 16/285; G06F 16/358; G06F 16/35–36;
(Continued)

(56) References Cited

U.S. PATENT DOCUMENTS 5,889,523 A * 3/1999 Wilcox ............... G06F 3/04883
715/854
5,988,854 A * 11/1999 Munakata .............. G06Q 50/04
700/95
(Continued)

FOREIGN PATENT DOCUMENTS

JP      7-141166     6/1995
JP      7-319676     12/1995
(Continued)

OTHER PUBLICATIONS

A. Aleta et al.,"Graph-partitioning based instruction scheduling for clustered processors", Proceedings. 34th ACM/IEEE International Symposium on Microarchitecture. MICRO-34, Dec. 2001, pp. 150-159.*

(Continued)

*Primary Examiner* — Srirama Channavajjala
(74) *Attorney, Agent, or Firm* — Fujitsu Patent Center

(57) ABSTRACT

An information processing device includes a memory that stores cluster information indicating multiple programs belonging to a cluster; and a processor that acquires a graph including multiple nodes corresponding to the multiple programs indicated by the cluster information and multiple edges indicating dependencies between the multiple programs, selects, from among the multiple nodes, a cut node that is arranged so that when the cut node is removed from the graph, the graph is divided into multiple disconnected partial graphs, extracts a word used in a program corresponding to the cut node among the multiple programs, and uses the extracted word to generate additional information to be associated with the cluster.

9 Claims, 20 Drawing Sheets

(51) Int. Cl.
*G06F 8/74* (2018.01)
*G06F 16/904* (2019.01)
*G06F 8/75* (2018.01)
*G06F 16/33* (2019.01)
*G06F 8/77* (2018.01)
*G06F 16/31* (2019.01)
*G06F 16/35* (2019.01)
*G06F 8/70* (2018.01)

(52) U.S. Cl.
CPC .............. *G06F 8/77* (2013.01); *G06F 16/322* (2019.01); *G06F 16/3334* (2019.01); *G06F 16/35* (2019.01); *G06F 16/358* (2019.01); *G06F 16/904* (2019.01)

(58) Field of Classification Search
CPC .... G06F 16/51; G06F 16/2246; G06F 16/906; G06F 16/9024; G06F 16/901; G06F 8/70; G06F 8/74–75; G06F 8/77
See application file for complete search history.

(56) References Cited

U.S. PATENT DOCUMENTS

| | | | | |
|---|---|---|---|---|
| 6,437,804 | B1* | 8/2002 | Ibe | G06F 30/18 715/736 |
| 7,962,907 | B2* | 6/2011 | Martin | G06F 9/3838 717/161 |
| 9,836,183 | B1* | 12/2017 | Love | G06F 16/9024 |
| 9,880,823 | B1* | 1/2018 | Barnea | G06F 9/5066 |
| 9,965,460 | B1* | 5/2018 | Wasiuk | G06F 40/284 |
| 10,679,011 | B2* | 6/2020 | Galitsky | G06N 3/006 |
| 10,891,319 | B2* | 1/2021 | Lysak | G06T 11/206 |
| 2008/0172674 | A1* | 7/2008 | Yee | G06F 9/5038 718/106 |
| 2011/0238408 | A1* | 9/2011 | Larcheveque | G06F 40/284 704/9 |
| 2012/0203584 | A1* | 8/2012 | Mishor | G06Q 30/02 705/7.11 |
| 2013/0185300 | A1* | 7/2013 | Kobayashi | G06F 16/904 707/737 |
| 2014/0354649 | A1* | 12/2014 | Aksu | G06F 16/9024 345/440 |
| 2015/0261580 | A1* | 9/2015 | Shau | G06F 9/4881 718/106 |
| 2015/0269243 | A1* | 9/2015 | Kobayashi | G06F 16/285 707/737 |

FOREIGN PATENT DOCUMENTS

| | | | |
|---|---|---|---|
| JP | 2013-148987 | | 8/2013 |
| JP | 2016-134079 | | 7/2016 |
| WO | WO 2009/132442 | * | 11/2009 |
| WO | WO2011119171 A2 | * | 9/2011 |

OTHER PUBLICATIONS

J. Hopcroft et al., "Algorithm 447: Efficient Algorithms for Graph Manipulation", Communications of the ACM, vol. 16, Issue 6, pp. 372-378, Jun. 1973 (7 pages).

K. Kobayashi et al., "SArF Map: Visualizing Software Architecture from Feature and Layer Viewpoints", the 21st IEEE International Conference on Program Comprehension (ICPC 2013), pp. 43-52, May 2013 (10 pages).

K. Yano et al., "Labeling Feature-Oriented Software Clusters for Software Visualization Application", the 22nd Asia-Pacific Software Engineering Conference (APSEC 2015), pp. 354-361, Dec. 2015 (8 pages).

* cited by examiner

CLUSTER INFORMATION STORAGE SECTION

142

| CLASS NAME | CLUSTER ID |
|---|---|
| merge.MergeProcessFrame | cluster538 |
| merge.MergeNodeFrame | cluster538 |
| compare.ComaringFrame | cluster538 |
| comare.ComaringConditionFrame | cluster538 |
| PropertyConditionFrame | cluster538 |
| EventSortedFrame | cluster538 |
| OutStatisticalCsvListener | cluster538 |
| concurrent.ConcurrentEventFrame | cluster538 |
| MenuBar | cluster538 |
| CsvTokenizer | cluster171 |
| ... | ... |

FIG. 11

INTERMEDIATE INFORMATION STORAGE SECTION — 123

143

| CLUSTER ID | CUT POINT | PARTIAL GRAPH IDs | COMMON WORD |
|---|---|---|---|
| cluster538 | MenuBar | sg1, sg2, sg3, sg4, sg5, sg6 | frame |
| ... | ... | ... | ... |

144

| PARTIAL GRAPH ID | NODES | RELATION DIRECTION |
|---|---|---|
| sg1 | merge.MergeProcessFrame, merge.MergeNodeFrame | mutual |
| sg2 | compare.ComparingFrame, compare.ComparingConditionFrame | mutual |
| sg3 | PropertyConditionFrame | used |
| sg4 | EventSortedFrame | used |
| sg5 | OutStatisticalCsvListener | used |
| sg6 | concurrent.ConcurrentEventFrame | used |
| ... | ... | ... |

INTERMEDIATE INFORMATION STORAGE SECTION

145

| CLUSTER ID | WORD | WEIGHT |
|---|---|---|
| cluster538 | menu | 5.0 |
| cluster538 | bar | 5.0 |
| cluster538 | frame | 2.0 |
| ... | ... | ... |

FIG. 13

INTERMEDIATE INFORMATION STORAGE SECTION — 123

| CLUSTER ID | WORDS |
|---|---|
| cluster538 | merge merge process frame |
| cluster538 | merge merge node frame |
| cluster538 | compare comparing frame |
| cluster538 | compare comparing condition frame |
| cluster538 | property condition frame |
| cluster538 | event sorted frame |
| cluster538 | out statistical csv listener |
| cluster538 | concurrent concurrent event frame |
| cluster538 | menu bar |
| cluster171 | csv tokenizer |
| ... | ... |

INTERMEDIATE INFORMATION STORAGE SECTION — 123

147

| CLUSTER ID | WORD | SCORE |
|---|---|---|
| cluster538 | frame | 14 |
| cluster538 | menu | 5 |
| cluster538 | bar | 5 |
| cluster538 | merge | 4 |
| cluster538 | concurrent | 2 |
| cluster538 | compare | 2 |
| cluster538 | event | 2 |
| cluster538 | condition | 2 |
| cluster538 | comparing | 2 |
| cluster538 | process | 1 |
| ... | ... | ... |

FIG. 15

ADDITIONAL INFORMATION STORAGE SECTION — 124

| CLUSTER ID | LABEL | EXPLANATION |
|---|---|---|
| cluster538 | frame; menu; bar | MenuBar USES frame |
| cluster539 | action; listener; dialog | <⋯> USES <⋯> |
| cluster540 | util; output; generation | <⋯> AND <⋯> HAVE RELATIONSHIPS WITH EACH OTHER |
| ... | ... | ... |

148

INFORMATION PROCESSING DEVICE AND INFORMATION PROCESSING METHOD

CROSS-REFERENCE TO RELATED APPLICATION

This application is based upon and claims the benefit of priority of the prior Japanese Patent Application No. 2017-141673, filed on Jul. 21, 2017, the entire contents of which are incorporated herein by reference.

FIELD

The embodiments discussed herein are related to an information processing device and an information processing method.

BACKGROUND

To newly develop application software that is executed in an information processing system, various types of design information are normally generated. The design information generated in the development of the new application software is useful for the maintenance and improvement of the application software after the development but is not stored until the maintenance or improvement of the application software in many cases. In addition, if the application software is repeatedly slightly improved after the start of an operation of the application software, design information for the improvement may not be generated and stored, and the stored design information may not match the actual application software.

Thus, programs such as source codes or object codes are analyzed to recognize the structure of the current application software. For example, to easily understand the application software, a dividing device that divides an existing program group into multiple clusters has been proposed. The proposed dividing device analyzes the program group and generates a dependency graph including nodes indicating the programs and edges (links) indicating dependencies between the programs. The dividing device divides the dependency graph into multiple partial graphs so that edges within each of the partial graphs are arranged at high densities and edges between the partial graphs are arranged at low densities. The dividing device treats programs corresponding to nodes included in the same partial graph as programs belonging to the same cluster.

In addition, a visualization method for generating a software map indicating the structure of application software from results of dividing a program group into multiple clusters has been proposed. On the proposed software map, programs are represented as two- or three-dimensional blocks, and blocks indicating programs belonging to the same cluster are arranged in the same segment at a high density.

In addition, to easily understand characteristics of clusters, a labeling method for generating additional information to be associated with the clusters has been proposed. The generated additional information is displayed in segments indicating the clusters while overlapping the segments on a software map. In the proposed labeling method, multiple words are extracted for each cluster from class names of programs belonging to the cluster, and a term frequency-inverse document frequency (tf-idf) value is calculated for each of the extracted words based on appearance frequencies of the words. Then, three words are selected as characteristic words in descending order of tf-idf value for each cluster, and a character string is generated as additional information by coupling the three characteristic words for each cluster.

Examples of related art are Japanese Laid-open Patent Publication No. 07-141166, Japanese Laid-open Patent Publication No. 07-319676, Japanese Laid-open Patent Publication No. 2013-148987, and Japanese Laid-open Patent Publication No. 2016-134079

Other examples of related art are Kenichi Kobayashi, Manabu Kamimura, Keisuke Yano, Koki Kato, and Akihiko Matsuo, "SArF Map: Visualizing Software Architecture from Feature and Layer Viewpoints", the 21st IEEE International Conference on Program Comprehension (ICPC 2013), pages 43-52, May 2013 and Keisuke Yano and Akihiko Matsuo, "Labeling Feature-Oriented Software Clusters for Software Visualization Application", the 22nd Asia-Pacific Software Engineering Conference (APSEC 2015), December 2015.

However, if additional information to be associated with clusters of programs is generated based on appearance frequencies of words, the additional information may not appropriately indicate characteristics of the clusters, and the accuracy of the additional information may be low. For example, it is considered that a cluster has a star structure in which a single main program has dependency relationships with peripheral multiple programs. In the cluster, regardless of the fact that the main program has an importance role, an appearance frequency of a word that appears only in the main program is low, and the word is not extracted as a characteristic word in some cases.

SUMMARY

According to an aspect of the embodiments, an information processing device includes a memory that stores cluster information indicating multiple programs belonging to a cluster; and a processor that acquires a graph including multiple nodes corresponding to the multiple programs indicated by the cluster information and multiple edges indicating dependencies between the multiple programs, selects, from among the multiple nodes, a cut node that is arranged so that when the cut node is removed from the graph, the graph is divided into multiple disconnected partial graphs, extracts a word used in a program corresponding to the cut node among the multiple programs, and uses the extracted word to generate additional information to be associated with the cluster.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a diagram illustrating an example of a cluster table;

FIG. 11 is a diagram illustrating an example of a cut point table and an example of a partial graph table;

FIG. 12 is a diagram illustrating an example of a word weight table;

FIG. 13 is a diagram illustrating an example of a cluster word table;

FIG. 14 is a diagram illustrating an example of a word score table;

FIG. 15 is a diagram illustrating an example of an additional information table;

DESCRIPTION OF EMBODIMENTS

Hereinafter, embodiments are described with reference to the accompanying drawings.

First Embodiment

A first embodiment is described below.

Figure 1:
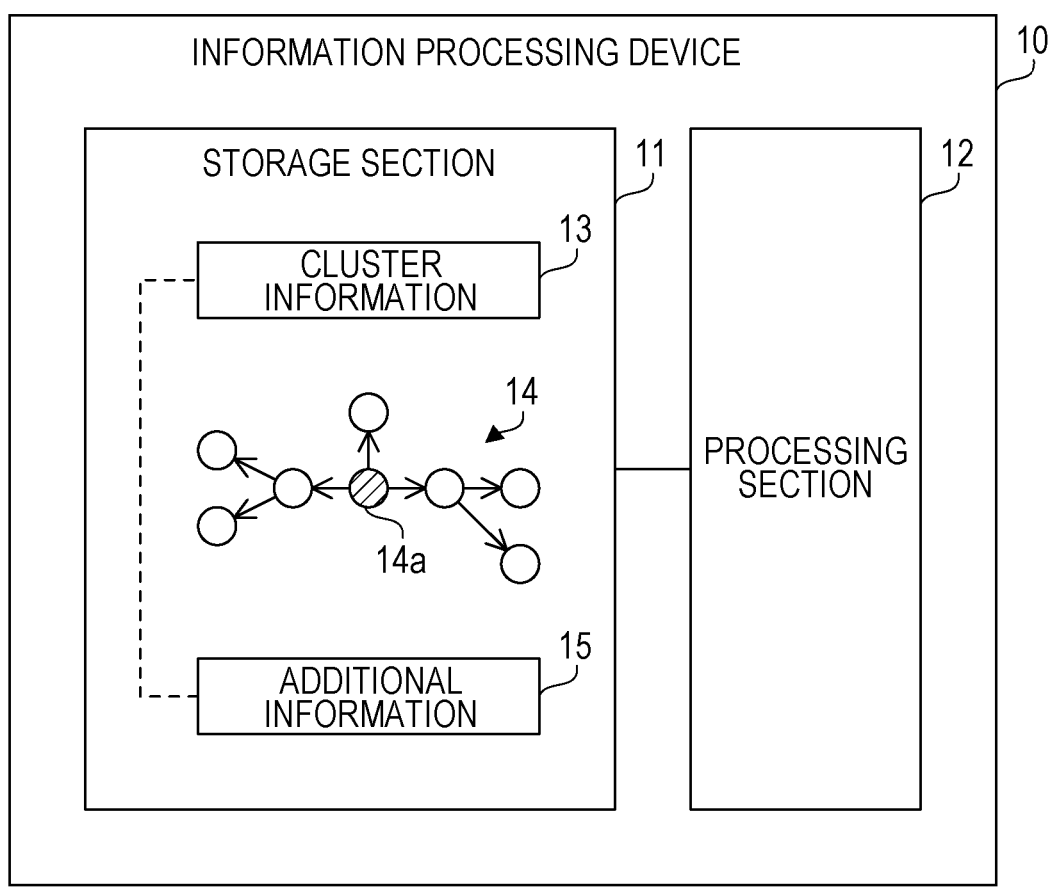
FIG. 1 is a diagram describing an information processing device according to a first embodiment.

FIG. 1 is a diagram describing an information processing device according to the first embodiment. The information processing device 10 according to the first embodiment visualizes the structure of software. The information processing device 10 may be a terminal device that is a client computer or the like and is operated by a user. Alternatively, the information processing device 10 may be a server device that is a server computer or the like and is accessed by a terminal device.

The information processing device 10 includes a memory 11 and a processing section 12. The memory 11 may be a volatile semiconductor memory such as a random access memory (RAM) or may be nonvolatile storage such as a hard disk drive (HDD) or a flash memory. The processing section 12 is a processor such as a central processing unit (CPU) or a digital signal processor (DSP), for example. The processing section 12, however, may include an application specific electronic circuit such as an application specific integrated circuit (ASIC) or a field programmable gate array (FPGA). The processor executes a program stored in the memory such as the RAM. A set of processors is referred to as "multiprocessor" or "processor" in some cases.

The memory 11 stores cluster information 13. The cluster information 13 indicates programs belonging to the same cluster and included in a program group included in the software to be visualized. The information processing device 10 or another information processing device executes clustering to classify the program group into multiple clusters. Each of the clusters is a set of programs highly dependent on each other. For example, the clustering is executed to analyze the program group, generate a dependency graph indicating dependencies between programs, such as calling relationships between the programs or inheritance relationships between the programs, and extract, as a cluster from the dependency graph, partial graphs, each of which includes programs that are highly dependent on each other. Units of the programs may be arbitrary or may be classes, functions, or files. The memory 11 may store the programs such as source codes or object codes.

The processing section 12 acquires a graph 14 indicating dependencies between the multiple programs belonging to the same cluster indicated by the cluster information 13. The graph 14 is implemented by a computer based on graph theory. The graph 14 includes multiple nodes corresponding to the multiple programs belonging to the same cluster and multiple edges (links) connecting the nodes to each other and indicating dependencies between the multiple programs. The graph 14 may be a directed graph in which the edges indicate directions of the dependencies. The processing section 12 may use, as the graph 14, a portion corresponding to the cluster and included in the dependency graph generated upon the clustering. In addition, the processing section 12 may generate the graph 14 based on the cluster information 13 and the programs by analyzing the dependencies between the programs belonging to the same cluster.

The processing section 12 analyzes the structure of the graph 14 and selects a cut node 14a (hereinafter merely referred to as "cut point" in some cases) from among the multiple nodes included in the graph 14. The cut node 14a is arranged so that if the cut node 14a is removed from the graph 14, the graph 14 is divided into multiple disconnected partial graphs. In the example illustrated in FIG. 1, if the cut node 14a is removed from the graph 14, the graph 14 is divided into three partial graphs, a partial graph including three nodes, a partial graph including one node, and a partial graph including three nodes.

If multiple candidate cut nodes exist in the graph 14, the processing section 12 may select only a single cut node from among the candidate cut nodes or may select two or more cut nodes from among the candidate cut nodes. The processing section 12 may narrow down the nodes to a cut node to be selected in accordance with a predetermined evaluation standard. For example, the processing section 12 may select, on a priority basis, a cut node that is arranged so that if the cut node is removed from the graph 14, the number of partial graphs into which the graph 14 is divided is the largest. In addition, the processing section 12 may select, on a priority basis, a cut node that is arranged so that if the cut node is removed from the graph 14, a deviation in numbers of nodes included in partial graphs into which the graph 14 is divided is the smallest. Furthermore, the processing section 12 may select, on a priority basis, a cut node that is arranged so that if the cut node is removed from the graph, the number of partial graphs that are among partial graphs into which the graph is divided and each include nodes corresponding to programs to which different classification names have been added is the smallest. The classification names are names of classifications. The classification names are package names, directory names, or the like and are added to the programs upon the generation of the programs. The classifications added by a user upon the generation of the programs, and the clusters determined by the analysis of dependencies are different group concepts.

The processing section 12 extracts a word used in a program corresponding to the cut node 14a and included in the multiple programs belonging to the same cluster. For example, the extracted word is included in an identification name of the program. The identification name is described in the program and is a package name, a directory name, a file name, a function name, or the like. The processing section 12 uses the extracted word to generate additional information 15 to be associated with the cluster. If two or more words are able to be extracted from the program corresponding to the cut node 14a, the processing section 12 may use any of the words to generate the additional information 15 or may use two or more of the words to generate the additional information 15.

The additional information 15 is labels, explanations, and the like that indicate characteristics of the cluster and facilitates the understanding of the meaning of the cluster for the visualization of the structure of the software. Each of the labels may be a character string in which one or more words are enumerated. For example, the processing section 12 inserts the word extracted from the program corresponding to the cut node 14a into the additional information 15. The processing section 12 may insert a word extracted from another program into the additional information 15 but preferably inserts the word extracted from the program corresponding to the cut node 14a into the additional information 15. The processing section 12 may display the additional information 15 in the vicinity of a graphic indicating the cluster upon the display of visualized data that is a software map or the like and has been obtained by visualizing results of the clustering of the program group.

The information processing device 10 according to the first embodiment acquires the graph 14 including the nodes indicating the programs belonging to the same cluster and the edges indicating the dependencies between the programs and selects the cut node 14a from the graph 14. Then, the information processing device 10 according to the first embodiment extracts the word used in the program corresponding to the cut node 14a and uses the extracted word to generate the additional information 15 to be associated with the cluster. Thus, the accuracy of the additional information 15 may be improved.

For example, if a word to be used in the additional information 15 is simply selected based on appearance frequencies of words in the cluster, the additional information may not appropriately indicate characteristics of the cluster. This is due to the fact that, in a cluster that has a star structure in which a main program has dependency relationships with peripheral multiple programs, an appearance frequency of a word that appears only in the main program is low and the word is hardly selected, regardless of the fact that the main program has an important role. On the other hand, in the first embodiment, words used in the program corresponding to the cut node 14a are prioritized, the appropriate additional information 15 in which the structure of the cluster is reflected is generated.

Second Embodiment

Next, a second embodiment is described. An analyzing device 100 according to the second embodiment analyzes source codes of existing application software and visualizes the structure of the application software. The analyzing device 100 classifies a program group included in the application software into multiple clusters and generates a software map by visually representing results of executing clustering on the program group. In addition, the analyzing device 100 generates additional information describing characteristics of the clusters and displays the additional information on the software map. The analyzing device 100 may be a client computer or a server computer.

Figure 2:
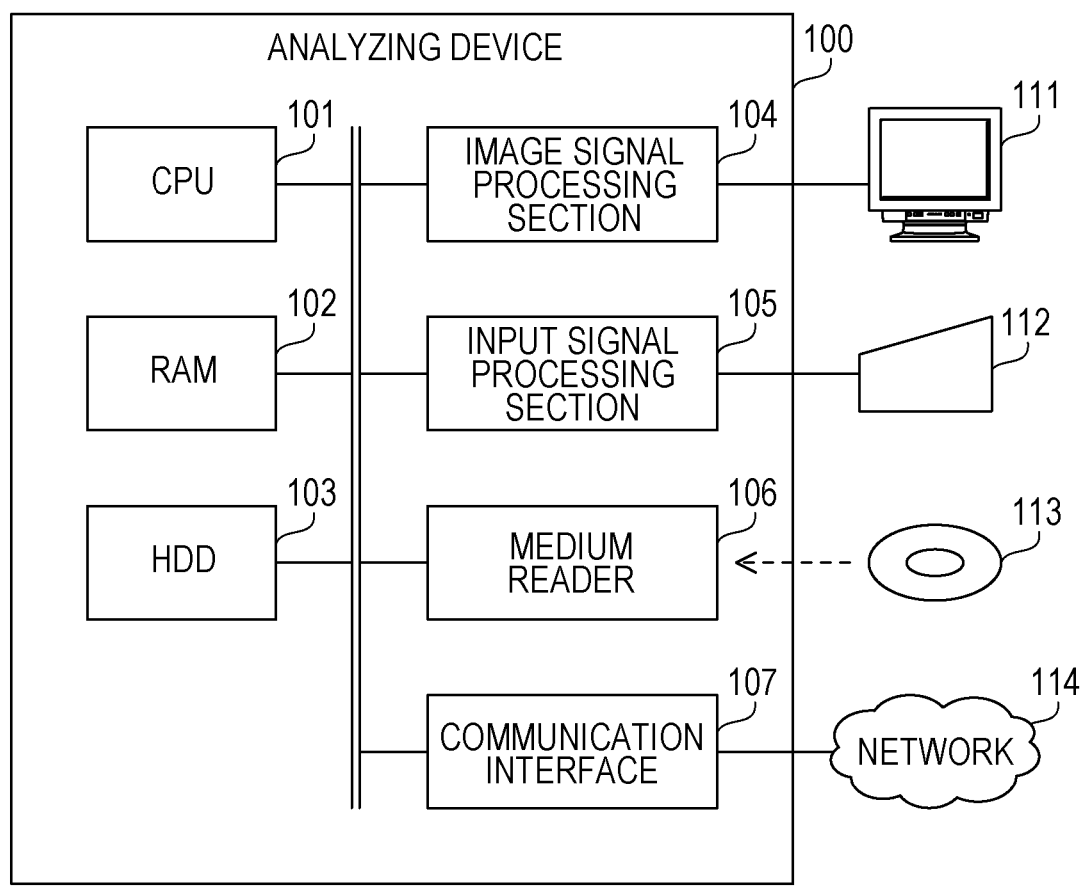
FIG. 2 is a block diagram illustrating an example of hardware of an analyzing device according to a second embodiment.

FIG. 2 is a block diagram illustrating an example of hardware of the analyzing device according to the second embodiment. The analyzing device 100 includes a CPU 101, a RAM 102, an HDD 103, an image signal processing section 104, an input signal processing section 105, a medium reader 106, and a communication interface 107. The CPU 101 corresponds to the processing section 12 according to the first embodiment. The RAM 102 or the HDD 103 corresponds to the memory 11 according to the first embodiment.

The CPU 101 is a processor that executes a program command. The CPU 101 loads a program stored in the HDD 103 and a portion or all of data stored in the HDD 103 into the RAM 102 and executes the program. The CPU 101 may include multiple processor cores. The analyzing device 100 may include multiple processors and may use the multiple processors or the multiple processor cores to execute processes described later in parallel. In addition, a set of the multiple processors is hereinafter referred to as "multiprocessor" or simply referred to as "processor" in some cases.

The RAM 102 is a volatile semiconductor memory that temporarily stores the program to be executed by the CPU 101 and data to be used for the CPU 101 to execute computation. The analyzing device 100 may include another type of memory other than RAMs and may include multiple memories.

The HDD 103 is a nonvolatile storage device that stores data and software programs such as an operating system (OS) and middleware. The analyzing device 100 may include another type of storage device such as a flash memory or a solid state drive (SSD) and may include multiple nonvolatile storage devices.

The image signal processing section 104 outputs an image to a display 111 connected to the analyzing device 100 in accordance with a command from the CPU 101. The image signal processing section 104 may be a graphics board, a graphics card, or an interface card, for example. As the display 111, an arbitrary type of display such as a cathode ray tube (CRT) display, a liquid crystal display (LCD), a plasma display, or an organic electro-luminescence (OEL) display may be used.

The input signal processing section 105 may acquire an input signal from an input device 112 connected to the analyzing device 100 and outputs the input signal to the CPU 101. The input signal processing section 105 may be an interface cord. As the input device 112, a pointing device such as a mouse, a touch panel, a touch pad, or a track ball, a keyboard, a remote controller, a button switch, or the like may be used. In addition, multiple types of input devices may be connected to the analyzing device 100.

The medium reader 106 is a reading device that reads a program recorded in a recording medium 113 and data recorded in the recording medium 113. As the recording medium 113, a magnetic disk, an optical disc, a magneto-optical (MO) disk, a semiconductor memory, or the like may be used, for example. Examples of the magnetic disk include a flexible disk (FD) and an HDD. Examples of the optical disc include a compact disc (CD) and a digital versatile disc (DVD).

The medium reader 106 copies the data and program read from the recording medium 113 to another recording medium such as the RAM 102, the HDD 103, or the like, for example. The read program is executed by the CPU 101, for example. The recording medium 113 may be a portable recording medium and may be used for the distribution of the program and the data. The recording medium 113 and the HDD 103 are hereinafter referred to as computer-readable media in some cases.

The communication interface 107 communicates with another information processing device via a network 114 and may be an interface card. The communication interface 107 may be a wired communication interface connected to a wired communication device such as a switch or a router or may be a wireless communication interface connected to a wireless communication device such as a base station or an access point.

Figure 3:
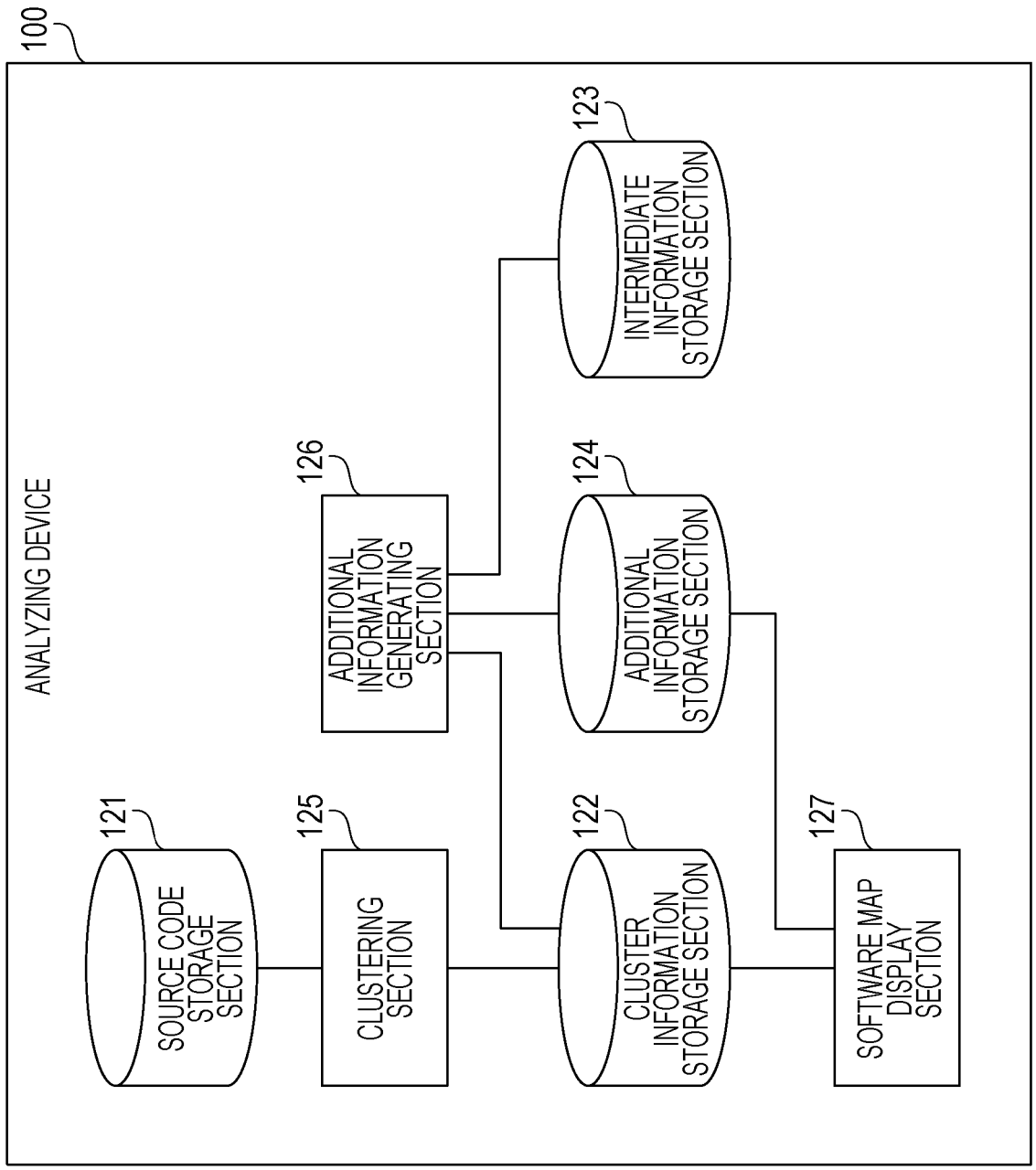
FIG. 3 is a block diagram illustrating an example of functions of the analyzing device.

FIG. 3 is a block diagram illustrating an example of functions of the analyzing device. The analyzing device 100 includes a source code storage section 121, a cluster information storage section 122, an intermediate information storage device 123, an additional information storage section 124, a clustering section 125, an additional information generating section 126, and a software map display section 127. The source code storage section 121, the cluster information storage section 122, the intermediate information storage device 123, and the additional information storage section 124 are implemented using storage regions of the RAM 102 or storage regions of the HDD 103, for example. The clustering section 125, the additional information generating section 126, and the software map display section 127 are implemented using program modules executed by the CPU 101, for example.

The source code storage section 121 stores a source code group of the source codes of the application software to be analyzed. The source codes are programs described in an easily understandable high-level language. The source codes are provided from a person who is an owner or operator of the application software and requests the analysis, for example. In the second embodiment, a single source code to be processed is treated as a single "program". As units of the source codes, classes, methods, functions, or the like may be used. The following description assumes that the source codes are described in an object-oriented language and that classes are used as the units of the source codes.

The cluster information storage section 122 stores cluster information indicating results of executing the clustering to classify the program group into multiple clusters. The cluster information is information in which cluster IDs identifying the clusters are associated with class names identifying the programs. Sets of classes are classified into hierarchically structured packages upon the development of the application software, and class names include package names indicating the packages to which the classes belong.

The intermediate information storage section 123 stores intermediate information to be internally used in a process of generating the additional information to be added to the clusters. The additional information is automatically generated by analyzing the programs to facilitate the understanding of the characteristics of the clusters and includes labels and explanations. The intermediate information includes information of words extracted from the programs and weights of the words, as described later.

The additional information storage section 124 stores the additional information including the explanations and labels added to the clusters. Each of the labels is a character string obtained by coupling a predetermined number (for example, 3) of characteristic words indicating characters of a cluster. Each of the explanations is a short sentence describing the structure of a cluster or relationships between multiple programs belonging to the same cluster.

The clustering section 125 executes the clustering to classify the program group stored in the source code storage section 121 into the clusters, generates the cluster information indicating the results of the clustering, and causes the cluster information to be stored in the cluster information storage section 122. In the clustering, the clustering section 125 generates dependency graphs indicating dependencies between the programs. The dependencies between the programs are calling relationships between the programs and inheritance relationships between the programs. Each of the dependency graphs includes nodes corresponding to programs and edges connecting the nodes to each other based on dependencies between the programs. The edges also indicate directions of the dependencies, and each of the dependency graphs is a directed graph. The clustering section 125 classifies the nodes included in the dependency graphs into the clusters so that the number of edges between nodes belonging to the same cluster is large and the number of edges between nodes belonging to different clusters is small.

The additional information generating section 126 references the cluster information stored in the cluster information storage section 122, generates the additional information to be associated with the multiple clusters, and causes the additional information to be stored in the additional information storage section 124. The additional information includes the labels and the explanations. In a process of generating the additional information, the additional information generating section 126 generates intermediate information at appropriate time and causes the intermediate information to be stored in the intermediate information storage section 123.

As described later, the additional information generating section 126 extracts words from the class names of the programs belonging to the clusters, selects characteristic words for each of the clusters based on appearance frequencies of words, and uses the selected characteristic words to generate the additional information. The words may be extracted from portions of package names included in the class names. The additional information generating section 126, however, does not simply select characteristic words based on the appearance frequencies of the words and selects the characteristic words based on the appearance frequencies of the words and structures of dependencies of the programs within the clusters.

In the selection of the characteristic words, the additional information generating section 126 acquires a dependency graph for each of the clusters and selects a cut point connecting different portions to each other within each of the dependency graphs. Each of the cut points is a node that is arranged so that if the node is removed from a graph, the graph is divided into multiple disconnected partial graphs. The additional information generating section 126 may use an entire dependency graph generated by the clustering section 125 to acquire the dependency graphs for the clusters. In addition, the additional information generating section 126 may analyze the programs stored in the source code storage section 121 and generate the dependency graphs for the clusters. The additional information generating section 126 prioritizes words extracted from programs corresponding to the cut points over other words. In addition, the additional information generating section 126 prioritizes common words commonly extracted from multiple partial graphs arranged close to the cut points over other words. Thus, the additional information in which the cluster structures are reflected is generated.

The software map display section 127 uses the cluster information stored in the cluster information storage section 122 to generate the software map by visualizing the results of executing the clustering on the programs.

The software map is a two- or three-dimensional map image in which the programs belonging to the clusters are associated with buildings arranged in segments associated with the clusters. The software map presents a software structure by a city metaphor and the application software including each of the programs that are the buildings on the software map. Each height of the buildings may correspond to program reflected by freely-selected metrics. Herewith the feature of the program may be visualized visually The software map display section 127 causes the display 111 to display the generated software map. In addition, the software map display section 127 causes the display 111 to display the additional information stored in the additional information storage section 124 so that the additional information overlaps the segments of the software map. In this case, the software map display section 127 may cause the display 111 to display the labels and explanations included in the additional information or may cause the display 111 to display the labels or explanations included in the additional information in accordance with a user operation.

Figure 4:
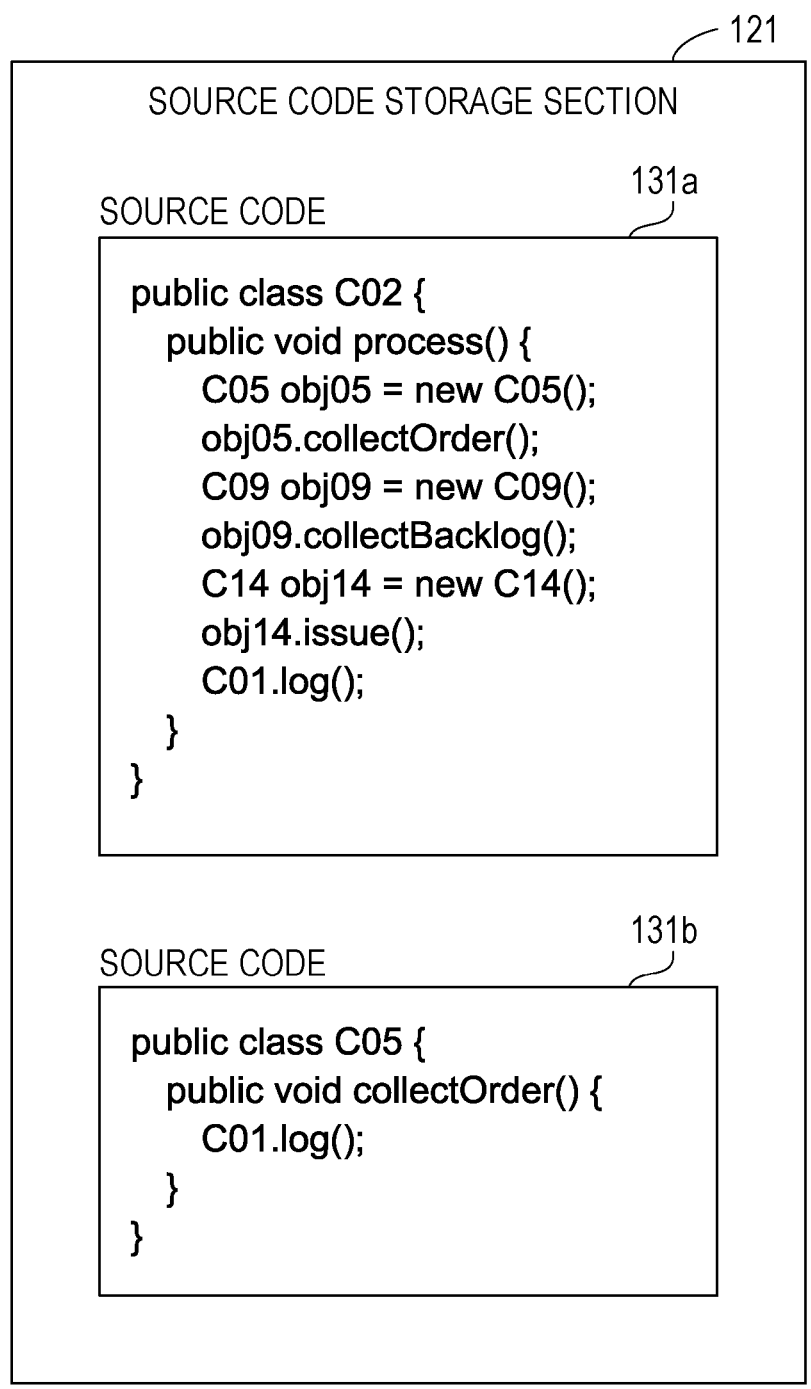
FIG. 4 is a diagram illustrating an example of source codes.

Next, the clustering of the programs is described. FIG. 4 is a diagram illustrating an example of the source codes. Source codes 131a and 131b are an example of the source codes stored in the source code storage section 121. The source codes 131a and 131b are described in an object-oriented language. Each of the source codes 131a and 131b includes a single class.

Class C02 is described in the source code 131a. Class C02 includes a method "process" that is able to be called from another class. The method "process" calls a method "collectOrder" of class C05, a method "collectBacklog" of class C09, a method "issue" of class C14, and a method "log" of class C01. Class C05 is described in the source code 131b. Class C05 includes a method "collectOrder" that is able to be called from another class. The method "collectOrder" calls the method "log" of class C01. Each of classes C02 and C05 is treated as a single program. The clustering section 125 analyzes the source codes 131a and 131b to detect a calling relationship from class C02 to class C05.

Figure 5:
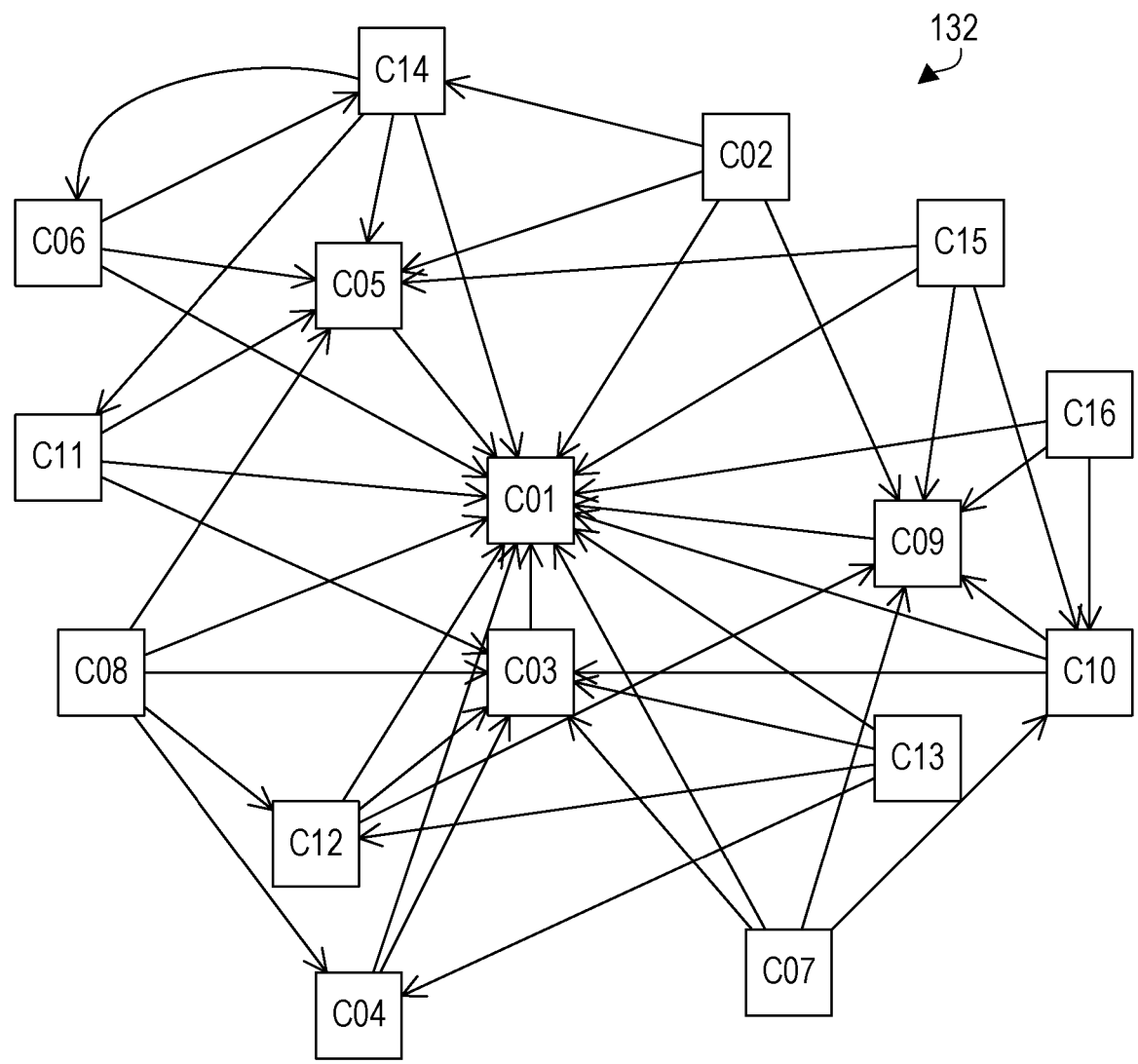
FIG. 5 is a diagram illustrating an example of an entire dependency graph.

FIG. 5 is a diagram illustrating an example of the entire dependency graph. The case where 16 classes C01 to C16 are described in the source codes is considered. A dependency graph 132 is a directed graph indicating calling relationships between classes C01 to C16. The dependency graph 132 includes multiple nodes corresponding to classes C01 to C16 and multiple edges indicating calling relationships between classes C01 to C16. Starting edges (sources) of arrows indicate call sources, while ending edges (targets) of the arrows indicate call destinations. For example, class C02 calls classes C01, C05, C09, and C14.

Weights are added to the edges included in the dependency graph 132. A weight added to an edge indicating a certain class as a call destination is inversely proportional to the number of edges indicating the certain class as the call destination. If the number of the edges indicating the certain class as the call destination is K (K is an integer of 1 or more), a weight of 1/K is added to each of the number K of the edges. For example, since the number of edges indicating class C05 as a call destination is 6, weights added to the 6 edges are ⅙.

Figure 6:
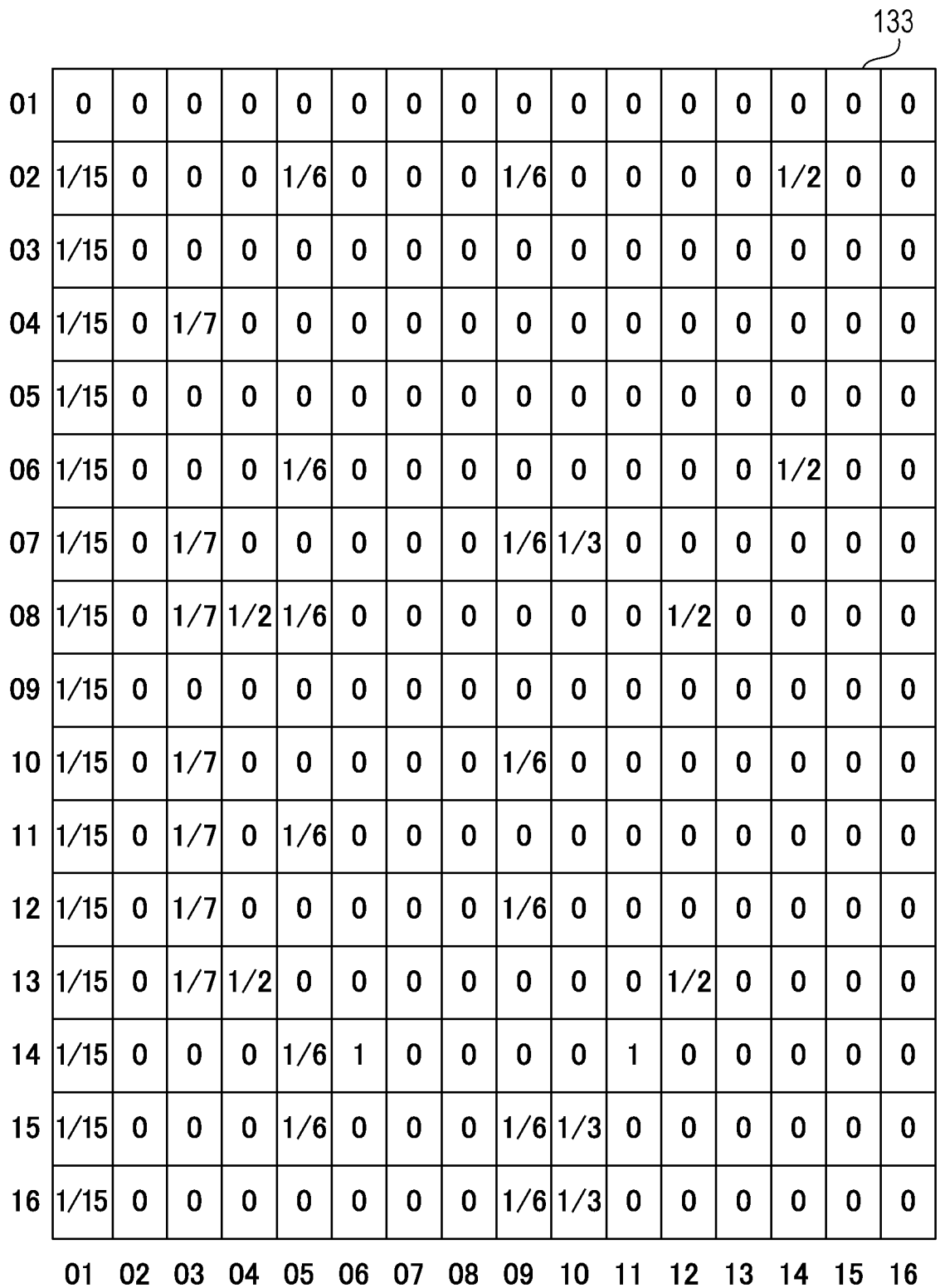
FIG. 6 is a diagram illustrating an example of an adjacency matrix corresponding to the dependency graph.

FIG. 6 is a diagram illustrating an example of an adjacency matrix corresponding to the dependency graph. The clustering section 125 analyzes the source codes to generate an adjacency matrix 133 (adjacency matrix X). Rows of the adjacency matrix 133 correspond to call source programs (classes), while columns of the adjacency matrix 133 correspond to call destination programs (classes). The adjacency matrix 133 corresponds to the dependency graph 132 illustrated in FIG. 5. Since 16 programs corresponding to classes C01 to C16 exist, the adjacency matrix 133 is a square matrix having 16 rows and 16 columns.

An element (element $X_{ij}$) indicated in an i-th row and a j-th column within the adjacency matrix 133 indicates a calling relationship from an i-th program to a j-th program. The element $X_{ij}$ is a rational number of 0 or more and 1 or less. If the element $X_{ij}$ is 0, the element $X_{ij}$ indicates that the calling relationship from the i-th program to the j-th program does not exist. If the element $X_{ij}$ is 1/K, the element $X_{ij}$ indicates that the calling relationship from the i-th program to the j-th program exists and a weight of 1/K is added to an edge indicating the calling relationship from the i-th program to the j-th program. For example, an element indicated in the second row and the fifth column within the adjacency matrix 133 indicates ⅙. This element indicates that a calling relationship from the second program to the fifth program exists and that a weight of ⅙ is added to an edge indicating the calling relationship from the second program to the fifth program.

Figure 7:
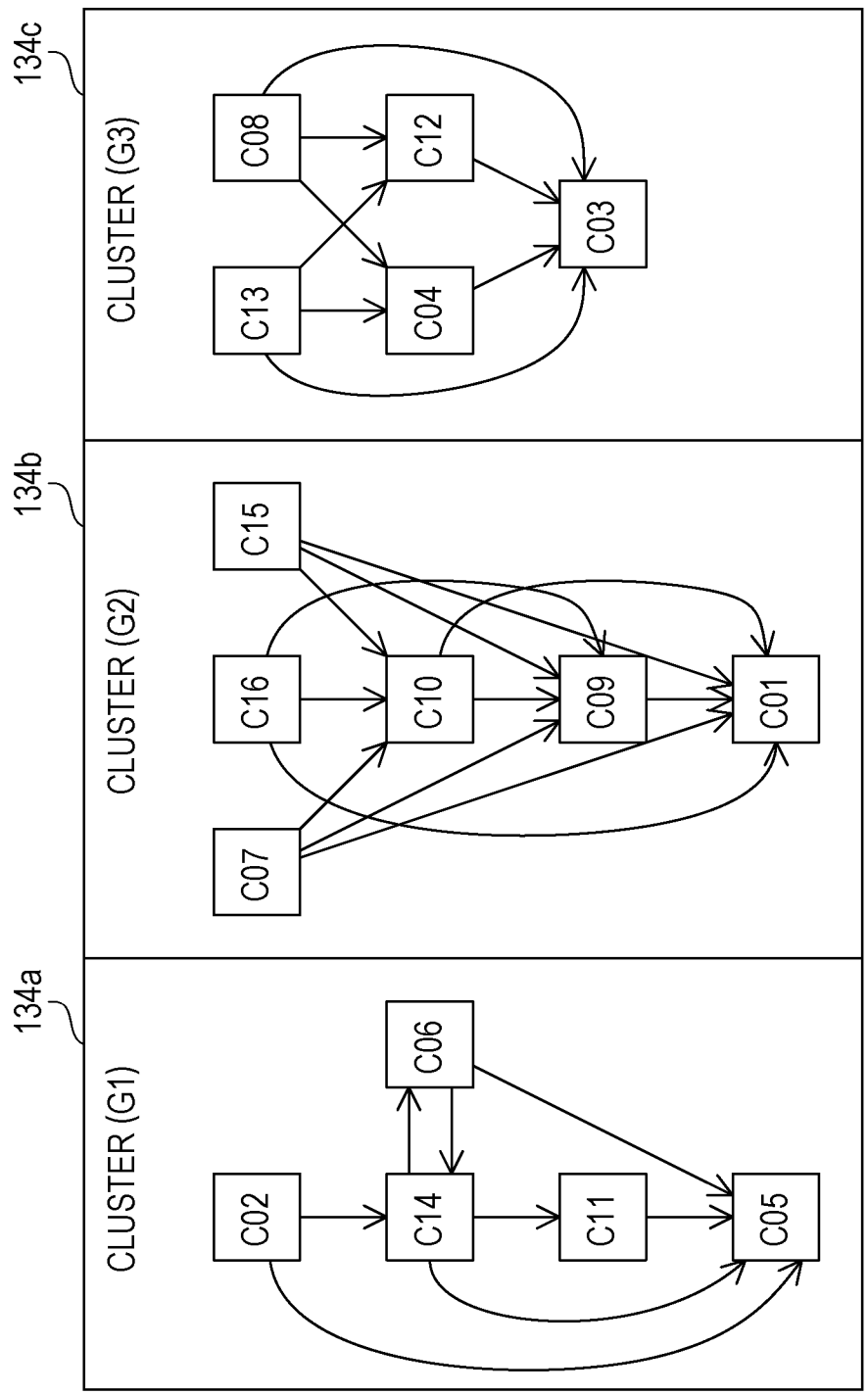
FIG. 7 is a diagram illustrating an example of the clustering of programs.

FIG. 7 is a diagram illustrating an example of the clustering of the programs. The clustering section 125 uses the adjacency matrix 133 to classify the programs (classes) into multiple clusters. Each of the clusters includes one or more programs. In principle, a set of programs having close calling relationships with each other is classified into the same cluster, while programs having distant calling relationships with each other is classified into different clusters.

As an example, clusters 134a, 134b, and 134c (clusters G1 to G3) are generated. The cluster 134a includes 5 programs corresponding to classes C02, C05, C06, C11, and C14. The cluster 134b includes 6 programs corresponding to classes C01, C07, C09, C10, C15, and C16. The cluster 134c includes 5 programs corresponding to classes C03, C04, C08, C12, and C13.

In the classification of the program group into the multiple clusters, a modularity evaluation value Q expressed by Equation (1) is used. The modularity evaluation value Q is a rational number of −1 or more and 1 or less. The modularity evaluation value Q indicates that as the modularity evaluation value Q is larger, the clustering is better and that as the modularity evaluation value Q is smaller, the clustering is worse.

$$Q = \frac{1}{m} \sum_{i,j} \left\{ \left( X_{ij} - \frac{k_i^{out} k_j^{in}}{m} \right) \delta(g_i, g_j) \right\} \quad (1)$$

$$\text{where } m = \sum_i \sum_j X_{ij}, \, k_i^{out} = \sum_j X_{ij}, \, k_j^{in} = \sum_i X_{ij}$$

In Equation (1), m is a value obtained by summing all elements of the adjacency matrix 133. $k_i^{out}$ is a value obtained by summing elements indicated in an i-th row of the adjacency matrix 133 or summing weights of edges indicating an i-th program as a call source. $k_j^{in}$ is a value obtained by summing elements indicated in a j-th column of the adjacency matrix 133 or summing weights of edges indicating a j-th program as a call destination. $g_i$ indicates a cluster to which the i-th program belongs, while $g_j$ indicates a cluster to which the j-th program belongs. $\delta(g_i, g_j)$ is the Kronecker delta. If $g_i$ and $g_j$ are equal to each other, $\delta(g_i, g_j)$ is 1. If $g_i$ and $g_j$ are different from each other, $\delta(g_i, g_j)$ is 0. $\delta(g_i, g_j)$ reflects calling relationships within the same cluster in the modularity evaluation value Q and ignores calling relationships between different clusters.

The clustering section 125 classifies the program group into the clusters so that the modularity evaluation value Q is the maximum. Details of a procedure for the clustering are described later. The clustering is executed in the aforementioned manner to determine the clusters to which the programs belong.

Figure 8:
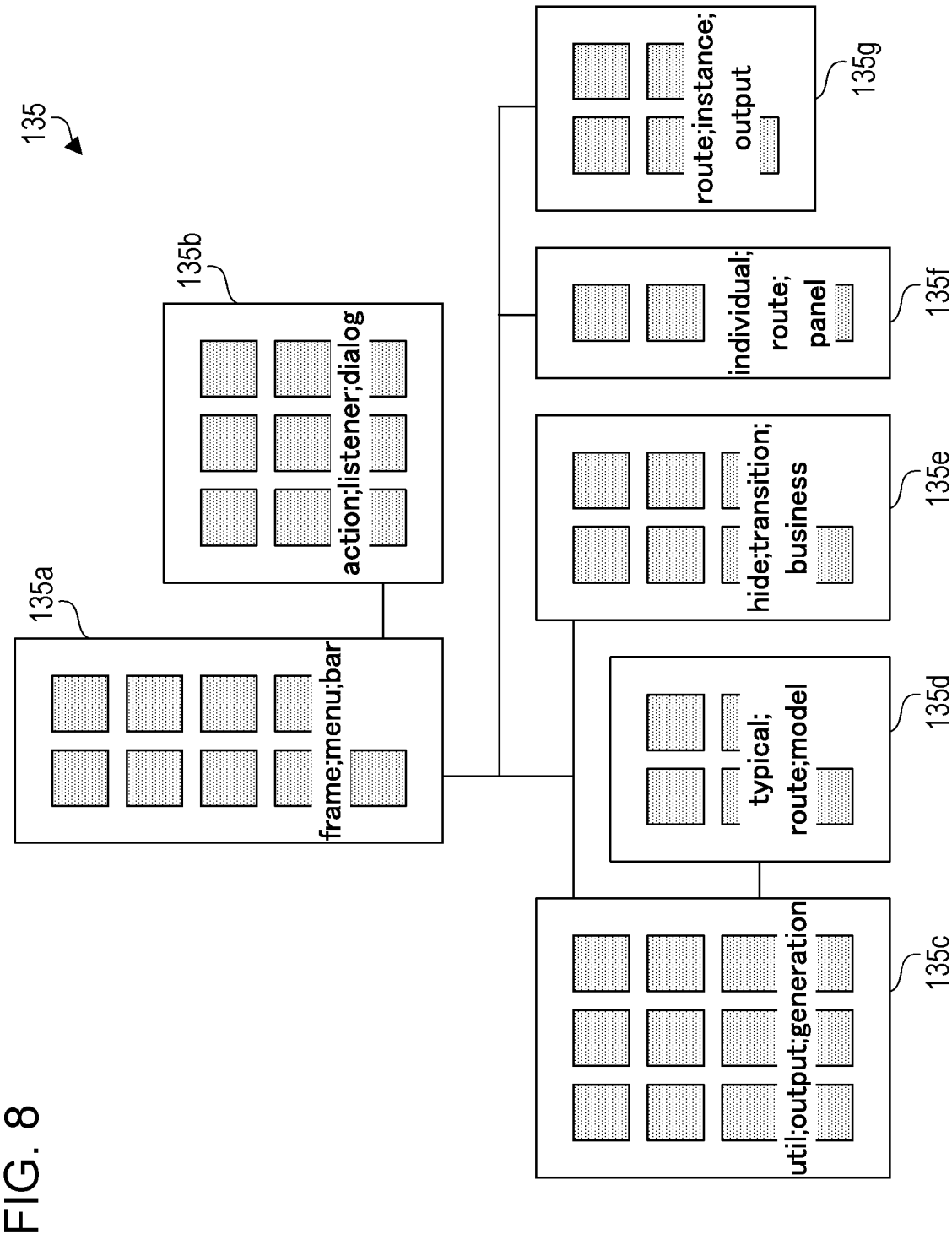
FIG. 8 is a diagram illustrating an example of a software map.

Next, the software map generated by the analyzing device 100 is described. FIG. 8 is a diagram illustrating an example of the software map. The software map display section 127 generates the software map using the cluster information generated by the aforementioned clustering and the additional information described later. A software map 135 is an example of the software map generated by the software map display section 127.

The software map 135 includes segments 135a, 135b, 135c, 135d, 135e, 135f, and 135g corresponding to 7 clusters. In addition, the software map 135 includes blocks corresponding to 51 buildings corresponding to 51 programs. The segment 135a includes 9 blocks. The segment 135b includes 9 blocks. The segment 135c includes 12 blocks. The segment 135d includes 5 blocks. The segment 135e includes 7 blocks. The segment 135f includes 4 blocks. The segment 135g includes 5 blocks. On the software map 135, the blocks are two-dimensionally represented but may be three-dimensionally represented.

On the software map 135, labels added to the clusters are displayed overlapping the segments. In this case, each of the labels is a character string obtained by coupling 3 characteristic words extracted from respective one of the clusters. In the segment 135a, "frame;menu;bar" is displayed overlapping the segment 135a. In the segment 135b, "action;listener;dialog" is displayed overlapping the segment 135b. In the segment 135c, "util;output;generation" is displayed overlapping the segment 135c. In the segment 135d, "typical;route;model" is displayed overlapping the segment 135d. In the segment 135e, "hide;transition;business" is displayed overlapping the segment 135e. In the segment 135f, "individual;route;panel" is displayed overlapping the segment 135f. In the segment 135g, "route;instance;output" is displayed overlapping the segment 135g.

In this manner, the entire structure of the application software may be easily understood and visualized by representing the clusters as segments and representing the programs as buildings. In addition, the use and functions of the programs belonging to the clusters may be easily understood by displaying the labels of the clusters on the software map 135. Although the labels of the clusters are displayed on the software map 135, the explanations may be displayed on the software map 135 instead of the labels or may be displayed together with the labels on the software map 135. In addition, the display of one or more labels of one or more of all the clusters or the display of the labels of all the clusters may be turned on and off based on a user operation, and the display of one or more explanations of one or more of all the clusters or the display of the explanations of all the clusters may be turned on and off based on a user operation.

Figure 9:
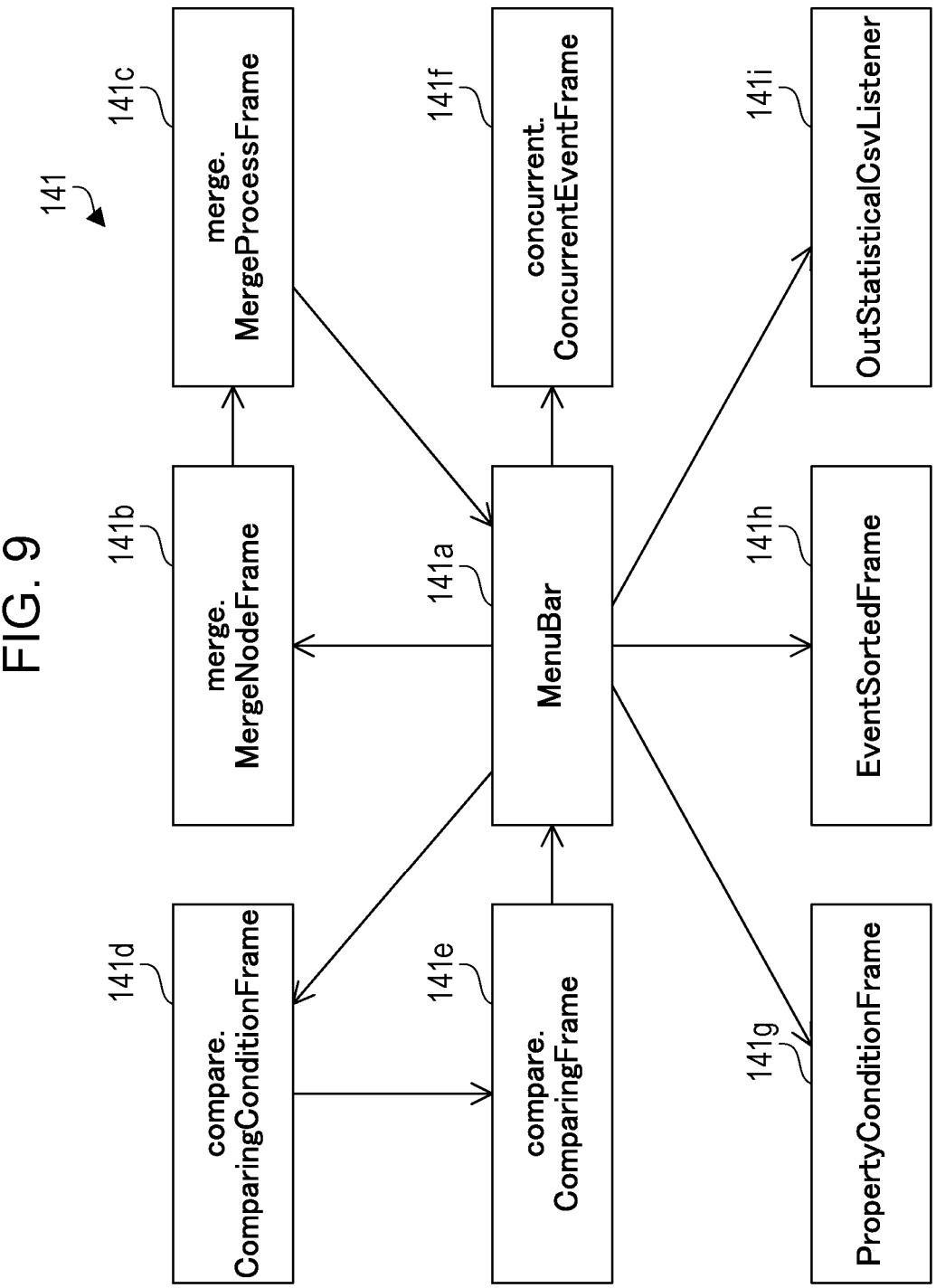
FIG. 9 is a diagram illustrating an example of a dependency graph within a cluster.

Next, the generation of the additional information is described. FIG. 9 is a diagram illustrating an example of a dependency graph within a cluster. A dependency graph 141 indicates a dependency graph between programs included in a single cluster. The additional information generating section 126 may acquire the dependency graph 141 by extracting a portion of a specific cluster from the entire dependency graph generated upon the clustering. In addition, the additional information generating section 126 may generate a dependency graph for each of the clusters by analyzing calling relationships between the programs in the same manner as the clustering section 125.

The dependency graph 141 includes nodes 141a, 141b, 141c, 141d, 141e, 141f, 141g, 141h, and 141i. It is assumed that this cluster is a program group of graphical user interfaces (GUIs) of which frames are connected to each other via a menu bar. The node 141a corresponds to a class with a class name "MenuBar". The node 141b corresponds to a class with a class name "merge.MergeNodeFrame". The node 141c corresponds to a class with a class name "merge.MergeProcessFrame". The node 141d corresponds to a class with a class name "compare.ComparingConditionFrame". The node 141e corresponds to a class with a class name "compare.ComparingFrame".

The node 141f corresponds to a class with a class name "concurrent.ConcurrentEventFrame". The node 141g corresponds to a class with a class name "PropertyConditionFrame". The node 141h corresponds to a class with a class name "EventSortedFrame". The node 141i corresponds to a class with a class name "OutStatisticalCsvListener". The character strings before the dots of the class names are package names.

The dependency graph 141 includes edges from the node 141a to the nodes 141b, 141d, 141f, 141g, 141h, and 141i and edges from the nodes 141c and 141e to the node 141a. The dependency graph 141 also includes an edge from the node 141b to the node 141c and an edge from the node 141d to the node 141e.

FIG. 10 is a diagram illustrating an example of a cluster table. A cluster table 142 is stored in the cluster information storage section 122. The cluster table 142 includes an item for class names and an item for cluster IDs. In the item for class names, class names described in the source codes and including package names and indicating full paths are registered. In the item for cluster IDs, identifiers identifying the clusters to which the programs indicated by the class names belong are registered. The cluster IDs are the identifiers assigned to the clusters by the clustering section 125 in the clustering. It is sufficient if the cluster IDs do not overlap each other.

In the cluster table 142, information of the multiple clusters may be registered. For example, the 9 class names illustrated in FIG. 9 are registered in the cluster table 142, and the same cluster ID associated with the 9 class names is registered in the cluster table 142.

FIG. 11 is a diagram illustrating an example of a cut point table and an example of a partial graph table. A cut point table 143 is stored in the intermediate information storage section 123. The cut point table 143 includes an item for cluster IDs, an item for cut points, an item for partial graph IDs, and an item for common words.

In the item for cluster IDs, the identifiers identifying the clusters are registered. In the item for cut points, class names of programs corresponding to selected cut points are registered. The cut points are nodes that are arranged so that if the nodes that are among nodes included in the dependency graphs of the clusters are removed from the dependency graphs, each of the dependency graphs is divided into multiple disconnected partial graphs. Normally, in a dependency graph of a single cluster, multiple nodes that satisfy the aforementioned definition for cut points exist. The additional information generating section 126 calculates evaluation values for multiple cut points of each dependency graph and selects a cut point for which the largest evaluation value has been calculated so that the selected cut point is as close as possible to the center of the dependency graph, as described later.

The additional information generating section 126, however, may select two or more cut points from each of the dependency graphs. For example, the additional information generating section 126 may select all cut points for which evaluation values exceeding a threshold have been calculated, or the additional information generating section 126 may select a predetermined number of cut points in descending order of evaluation value. As an example, the node 141a is selected as a cut point from among the nodes included in the dependency graph 141 illustrated in FIG. 9.

In the item for partial graph IDs, identifiers identifying multiple partial graphs generated by removing a cut point from each of the dependency graphs of the clusters are enumerated. If the node 141a is removed from the dependency graph 141 illustrated in FIG. 9, the dependency graph 141 is divided into 6 partial graphs sg1, sg2, sg3, sg4, sg5, and sg6. The partial graph sg1 includes the nodes 141b and 141c. The partial graph sg2 includes the nodes 141d and 141e. The partial graph sg3 includes the node 141g. The partial graph sg4 includes the node 141h. The partial graph sg5 includes the node 141i. The partial graph sg6 includes the node 141f.

In the item for common words, a common word commonly appearing in class names of many partial graphs among multiple partial graphs is registered. For example, a word commonly appearing in class names of more than half of multiple partial graphs is a common word. Since a word "frame" appears in the partial graphs sg1, sg2, sg3, sg4, and sg6 corresponding to ⅚=83% within the dependency graph 141 illustrated in FIG. 9, "frame" is a common word. A common word may not exist. In the cut point table 143, information of the multiple clusters may be registered.

A partial graph table 144 is stored in the intermediate information storage section 123. The partial graph table 144 includes an item for partial graph IDs, an item for nodes, and an item for relation directions. In the item for partial graph IDs, the identifiers identifying the partial graphs are registered. In the item for nodes, one or more class names of one or more programs corresponding to one or more nodes belonging to each of the partial graphs are enumerated.

In the item for relation directions, directions of dependencies between the cut points and the partial graphs are registered. If an edge from a node belonging to a partial graph to a cut point exists and an edge from the cut point to a node belonging to the partial graph does not exist, a relation direction indicates "use". The relation direction indicating "use" indicates that a program group corresponding to the partial graph uses a program corresponding to the cut point. If an edge from a cut point to a node belonging to a partial graph and an edge from a node belonging to the partial graph to the cut point does not exist, a relation direction indicates "used". The relation direction indicating "used" indicates that a program group corresponding to the partial graph is used by a program corresponding to the cut point. If an edge from a node belonging to a partial graph to a cut point exists and an edge from the cut point to a node belonging to the partial graph exists, a relation direction indicates "mutual". The relation direction indicating "mutual" indicates that the relation direction is not identified as a one-way direction. In the partial graph table 144, information of the multiple clusters may be registered.

FIG. 12 is a diagram illustrating an example of a word weight table. A word weight table 145 is stored in the intermediate information storage section 123. The word weight table 145 includes an item for cluster IDs, an item for words, and an item for weights. In the item for cluster IDs, the identifiers identifying the clusters are registered. In the item for words, words extracted from the class names of the programs belonging to the clusters are registered. In the item for weights, values indicating weights of the words are registered. In the word weight table 145, words of which weights are not 1.0 are registered and words of which weights are 1.0 are omitted. The former words are among words extracted from the class names and satisfy a predetermined requirement, while the latter words are all words excluding the former words.

The additional information generating section 126 sets weights of words included in a class name of a program corresponding to a cut point to a large value for each of the clusters. For example, the additional information generating section 126 sets the weights of the words of the cut points to 5.0. Weights of words "menu" and "bar" included in the dependency graph 141 illustrated in FIG. 9 are set to the large value. In addition, the additional information generating section 126 sets weights of common words to a large value for each of the clusters. It is, however, preferable that the weights of the common words be smaller than the weights of the cut points. For example, the additional information generating section 126 sets the weights of the common words to 2.0. A weight of the word "frame" included in the dependency graph 141 illustrated in FIG. 9 is set to the large value.

If a certain word is a word of a cut point and is a common word, the additional information generating section 126 sets the larger one (for example, 5.0 out of 5.0 and 2.0) of the weights for the certain word. Different weights may be added to the same word, depending on a cluster. In the word weight table 145, information of the multiple clusters may be registered.

FIG. 13 is a diagram illustrating an example of a cluster word table. A cluster word table 146 is stored in the intermediate information storage section 123. The cluster word table 146 includes an item for cluster IDs and an item for words. In the item for cluster IDs, the identifiers identifying the clusters are registered. In the item for words, one or more words extracted from each of the class names of the programs belonging to the clusters are enumerated. In this case, words overlapping each other are enumerated. The additional information generating section 126 may use a word dictionary to extract the words from the class names. Dots included in the class names may be recognized as delimiters. In addition, if an alphabetical capital letter is included in a class name, the capital letter may be recognized as the initial character of a word. In the cluster word table 146, information of the multiple clusters may be registered.

FIG. 14 is a diagram illustrating an example of a word score table. A word score table 147 is stored in the intermediate information storage section 123. The word score table 147 includes an item for cluster IDs, an item for words, and an item for scores. In the item for cluster IDs, the identifier identifying the clusters are registered. In the item for words, words extracted from the class names of the programs belonging to the clusters are registered. In the item for scores, word scores calculated from the word weight table 145 and the cluster word table 146 are registered.

The word scores indicate the numbers of times that the words to which weights have been added appear. The additional information generating section 126 aggregates the words enumerated in the cluster word table 146 and counts, for each of the clusters, the numbers of times that words appear. For a combination of a cluster and a word for which a weight is not registered in the word weight table 145, a weight is treated as 1.0, and a counted number of times that the word appears is treated as a word score. For a combination of a cluster and a word for which a weight is registered in the word weight table 145, a value obtained by multiplying the weight by a counted number of times that the word appears is treated as a word score.

For example, since the number of times that the word "frame" appears in the dependency graph 141 illustrated in FIG. 9 is 7, and the weight of the word "frame" is 2.0, a word score of the word "frame" is calculated to be 14. In addition, since the number of times that the word "menu" appears in the dependency graph 141 illustrated in FIG. 9 is 1, and the weight of the word "menu" is 5.0, a word score of the word "menu" is calculated to be 5. Furthermore, since the number of times that the word "bar" appears in the dependency graph 141 illustrated in FIG. 9 is 1, and the weight of the word "bar" is 5.0, a word score of the word "bar" is calculated to be 5. In the word score table 147, information of the multiple clusters may be registered.

FIG. 15 is a diagram illustrating an example of an additional information table. An additional information table 148 is stored in the additional information storage section 124. The additional information table 148 includes an item for cluster IDs, an item for labels, and an item for explanations. In the item for cluster IDs, the identifiers identifying the clusters are registered. In the item for labels, the labels added to the clusters are registered. In the item for explanations, the explanations added to the clusters are registered.

The additional information generating section 126 calculates tf-idf values of the words for each of the clusters based on the word score table 147 and selects, as characteristic words for each of the clusters, a predetermined number of words in descending order of tf-idf value. The additional information generating section 126 generates character strings as labels by coupling the selected characteristic words and registers the labels in the additional information table 148.

A tf-idf value calculated for each of the words is a product of a tf value and an idf value. As the tf value, a word score registered in the word score table 147 is used, for example. As the idf value, the reciprocal of the ratio of the number of clusters including the word to the number of all the clusters or "<the number of the clusters including the word>/<the number of all the clusters>" is used. The number of all the clusters is the number of the clusters generated by the clustering. The number of the clusters including the word may be calculated by referencing the cluster word table 146 and the word score table 147. As the number of times that the word appears is larger or a weight is larger, the tf value is larger and the tf-idf value is larger. In addition, as the number of the clusters including the word is smaller, the idf value is larger and the tf-idf value is larger.

In addition, the additional information generating section 126 generates an explanation for each of the clusters based on the cut point table 143 and the partial graph table 144 and registers the explanations in the additional information table 148. The explanations are short sentences simply indicating the structures of the clusters. The explanations are described in accordance with any of formats "<n> uses <m>", "<m> uses <n>", and "<m> and <n> have relationships with each other". The explanation phrase n is a class name of a cut point registered in the cut point table 143. The explanation phrase m is a common word registered in the cut point table 143. However, if the common word does not exist, the additional information generating section 126 extracts a characteristic word from each of multiple partial graphs and uses, as the explanation phrase m, a character string obtained by coupling the extracted characteristic words.

If relation directions between the cut point and the multiple partial graphs indicate only "used" or indicate "used" and "mutual", the aforementioned first format is used. If the relation directions between the cut point and the multiple partial graphs indicate only "use" or indicate "use" and "mutual", the aforementioned second format is used. In cases other than the aforementioned cases, the aforementioned third format is used. For the dependency graph 141 illustrated in FIG. 9, an explanation "MenuBar uses frame" is generated. In the additional information table 148, information of the multiple clusters may be registered.

Next, the calculation of evaluation values of cut points is described. If multiple cut points exist in a dependent graph, the additional information generating section 126 calculates evaluation values for the cut points and selects a cut point for which the largest evaluation value has been calculated. Each of the cut points is evaluated based on the number A of partial graphs, the degree B of evenness in numbers of nodes, and the heterogeneity C of the partial graphs, and the evaluation values of the cut points are calculated by adding weights to the three types of indices. Each of the evaluation values of the cut points is calculated by calculating $\alpha A + \beta B + \gamma C$. In this case, $\alpha$, $\beta$, and $\gamma$ are preset positive weights. $\alpha$, $\beta$, and $\gamma$ may be equal to 1.

Figure 16:
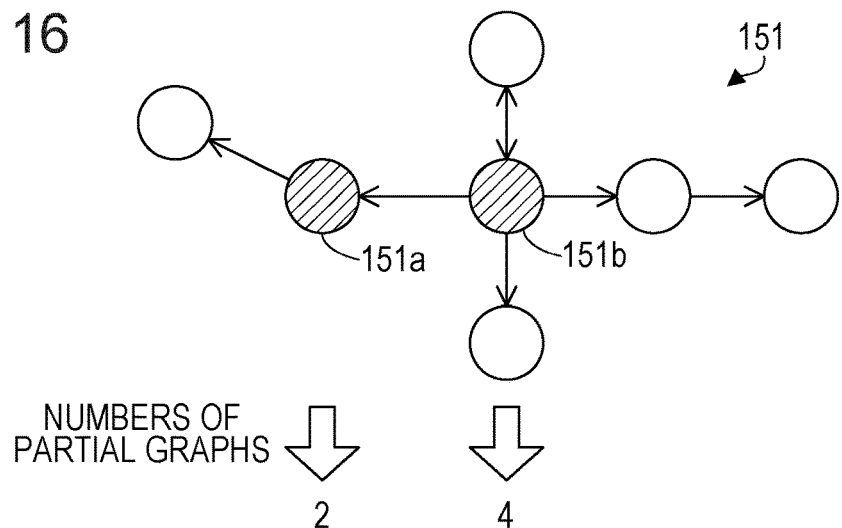
FIG. 16 is a diagram illustrating a first example of the calculation of evaluation values of cut points.

FIG. 16 is a diagram illustrating a first example of the calculation of the evaluation values of the cut points. The first example in which each of the cut points is evaluated based on the number A of partial graphs is described below. The number A of partial graphs is the number of the partial graphs to be generated by selecting a certain cut point. As the number A of the partial graphs is larger, an evaluation value of the certain cut point is larger. A dependency graph 151 includes 7 nodes including nodes 151a and 151b. The nodes 151a and 151b are cut points. If the node 151a is selected, the number A of partial graphs is 2. If the node 151b is selected, the number A of partial graphs is 4. Thus, based on the numbers A of partial graphs, the node 151b is more preferable than the node 151a.

Figure 17:
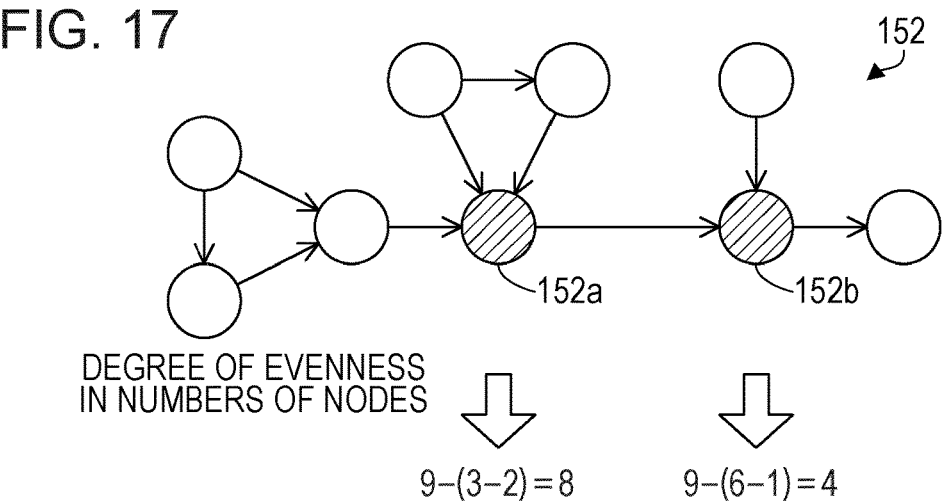
FIG. 17 is a diagram illustrating a second example of the calculation of evaluation values of cut points.

FIG. 17 is a diagram illustrating a second example of the calculation of the evaluation values of the cut points. The second example in which each of the cut points is evaluated based on the degree B of evenness in numbers of nodes is described below. The degree B of evenness in numbers of nodes is an index indicating a deviation in the numbers of the nodes between multiple partial graphs to be generated by selecting a certain cut point. As the deviation in the numbers of the nodes is smaller, the degree B of evenness in the numbers of the nodes is larger and an evaluation value of the certain cut point is larger. The degree B of evenness in the numbers of the nodes is calculated by calculating <the number of the nodes of a dependency graph of a cluster>− (<the number of nodes of the largest partial graph>−<the number of nodes of the smallest partial graph>).

A dependency graph 152 includes 9 nodes including nodes 152a and 152b. The nodes 152a and 152b are cut points. If the node 152a is selected, the dependency graph 152 is divided into a partial graph including 3 nodes, a partial graph including 2 nodes, and a partial graph including 3 nodes, and the degree B of evenness in numbers of nodes is calculated to be 9−(3−2)=8. If the node 152b is selected, the dependency graph 152 is divided into a partial graph including 6 nodes, a partial graph including 1 node, and a partial graph including 1 node, and the degree B of evenness in numbers of nodes is calculated to be 9−(6−1)=4. Thus, based on the degrees B of evenness in the numbers of the nodes, the node 152a is more preferable than the node 152b. Based on numbers A of partial graphs, values of the nodes 152a and 152b are equal or nearly equal to each other.

Figure 18:
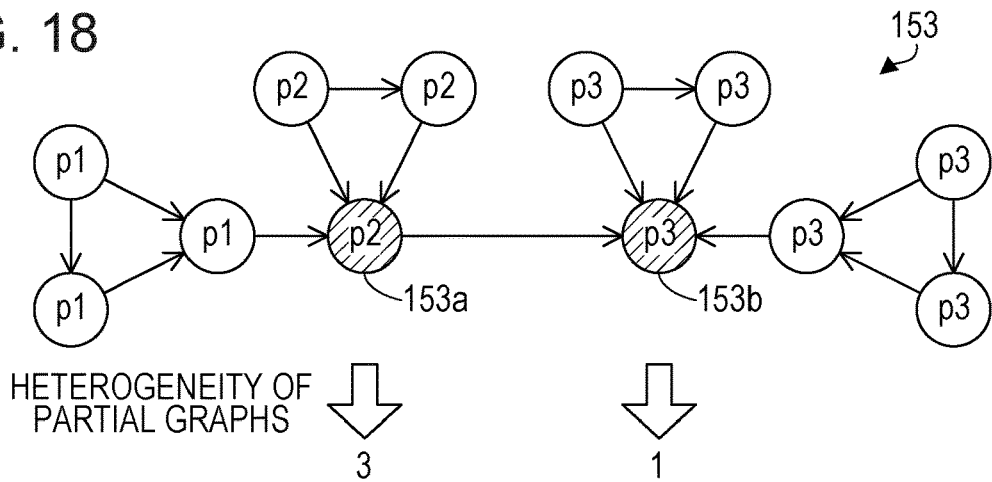
FIG. 18 is a diagram illustrating a third example of the calculation of evaluation values of cut points.

FIG. 18 is a diagram illustrating a third example of the calculation of the evaluation values of the cut points. The third example in which each of the cut points is evaluated based on the heterogeneity C of partial graphs is described below. The heterogeneity C of partial graphs is an index indicating a degree at which nodes to which different package names have been added do not exist in each of the partial graphs generated by selecting a certain cut point. As the number of partial graphs, each of which does not include nodes to which different package names have been added, is larger, the heterogeneity C of the partial graphs is larger and an evaluation value of the certain cut point is larger. The heterogeneity C of partial graphs is the number of package names that are among package names appearing in a cluster and occupy one or more partial graphs.

A dependency graph 153 includes 12 nodes including nodes 153a and 153b. The nodes 153a and 153b are cut points. If the node 153a is selected, the dependency graph 153 is divided into a partial graph including only a package name p1, a partial graph including only a package name p2, and a partial graph including only a package name p3. Thus, in this case, the heterogeneity C of the partial graphs is 3. If the node 153b is selected, the dependency graph 153 is divided into a partial graph including the package names p1 and p2, a partial graph including only the package name p3, and a partial graph including only the package name p3. Thus, in this case, the heterogeneity C of the partial graphs is 1. Based on the heterogeneity C of the partial graphs, the node 153a is more preferable than the node 153b. Based on numbers A of the partial graphs and the degrees B of evenness in numbers of nodes, values of the nodes 153a and 153b are equal to or nearly equal to each other.

Figure 19:
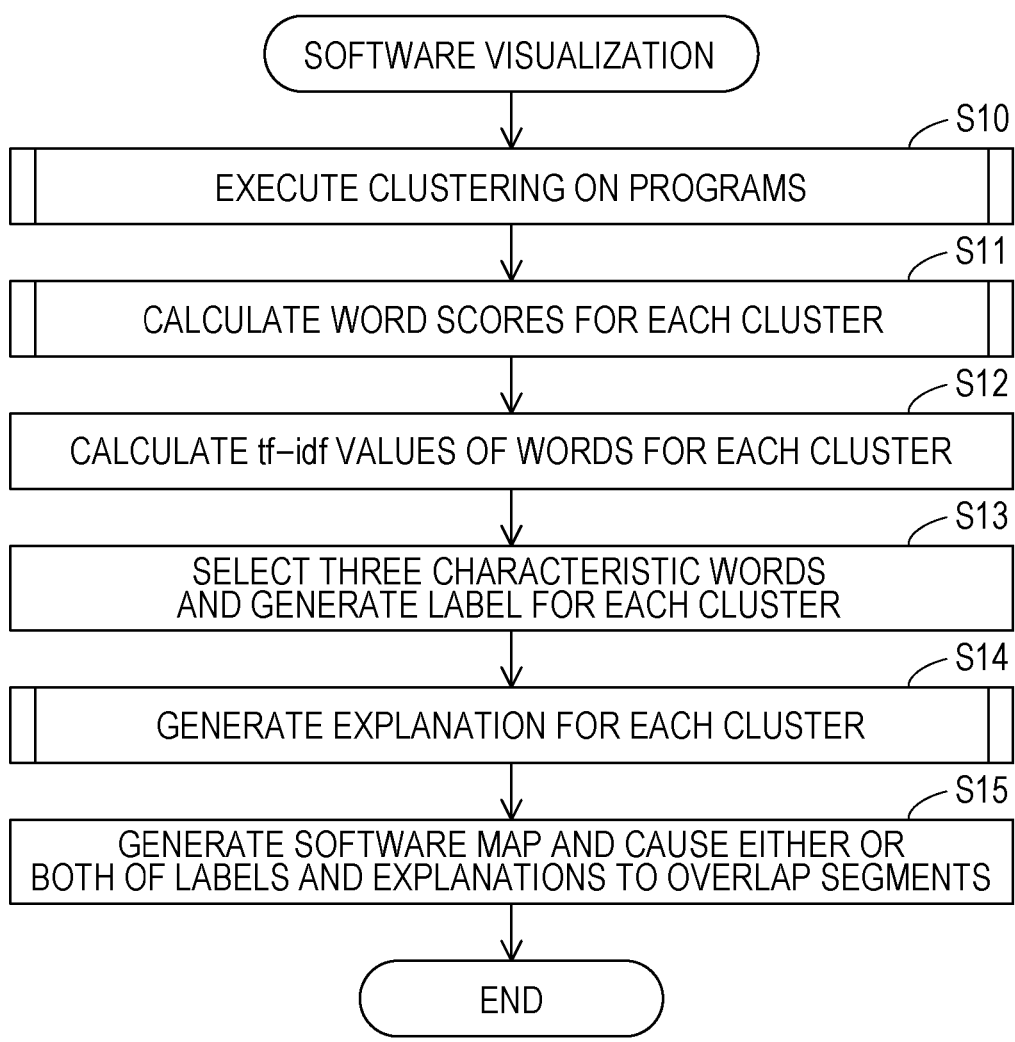
FIG. 19 is a flowchart of an example of a procedure for visualizing software.

Next, a process procedure of the analyzing device 100 is described. FIG. 19 is a flowchart of an example of a procedure for visualizing the software. In step S10, the clustering section 125 executes the clustering to classify the program group stored in the source code storage section 121 into multiple clusters. The clustering section 125 generates the cluster table 142 indicating the results of the clustering and causes the cluster table 142 to be stored in the cluster information storage section 122. A procedure for the clustering is described later.

In step S11, the additional information generating section 126 references the cluster table 142, selects cut points for the clusters, and generates the cut point table 143 and the partial graph table 144. The additional information generating section 126 references the cut point 143, determines weights of words for each of the clusters, and generates the word weight table 145. In addition, the additional information generating section 126 extracts words from class names of programs for each of the clusters and generates the cluster word table 146. Then, the additional information generating section 126 references the word weight table 145 and the cluster word table 146, calculates word scores of the words for each of the clusters, and generates the word score table 147. A procedure for calculating the word scores is described later.

In step S12, the additional information generating section 126 references the cluster word table 146 or the word score table 147 and calculates, as an idf value for each of the words, the reciprocal of the ratio of the number of clusters including the word to the number of all the clusters. In addition, the additional information generating section 126 uses, as tf values, word scores registered in the word score table 147. Then, the additional information generating section 126 multiplies the tf values of the words by the idf values to calculate tf-idf values for each of the clusters.

In step S13, the additional information generating section 126 sorts the words in descending order of tf-idf value for each of the clusters and selects three words as characteristic words in descending order of tf-idf value for each of the clusters. The additional information generating section 126 generates a label by coupling the three characteristic words for each of the clusters and registers the labels in the additional information table 148 stored in the additional information storage section 124.

In step S14, the additional information generating section 126 references the cut point table 143 and the partial graph table 144 and generates, for each of the clusters, an explanation indicating relationships between a cut point and partial graphs arranged in the vicinity of the cut point. The additional information generating section 126 registers the explanations in the additional information table 148. A procedure for generating the explanations is described later.

In step S15, the software map display section 127 references the cluster table 142 and generates a two- or three-dimensional software map in which the clusters are associated with segments and in which programs belonging to the clusters are associated with buildings within the segments. The software map display section 127 causes either or both of the labels registered in the additional information table 148 and the explanations registered in the additional information table 148 to overlap the segments associated with the clusters. Then, the software map display section 127 causes the display 111 to display the generated software map.

In the second embodiment, although the generated labels and the generated explanations are displayed on the software map or the generated labels or the generated explanations are displayed on the software map, the labels and the explanations may be output in a different manner or the labels or the explanations may be output in a different manner. For example, a list such as the additional information table 148 may be output to the display 111 or another output device.

Figure 20:
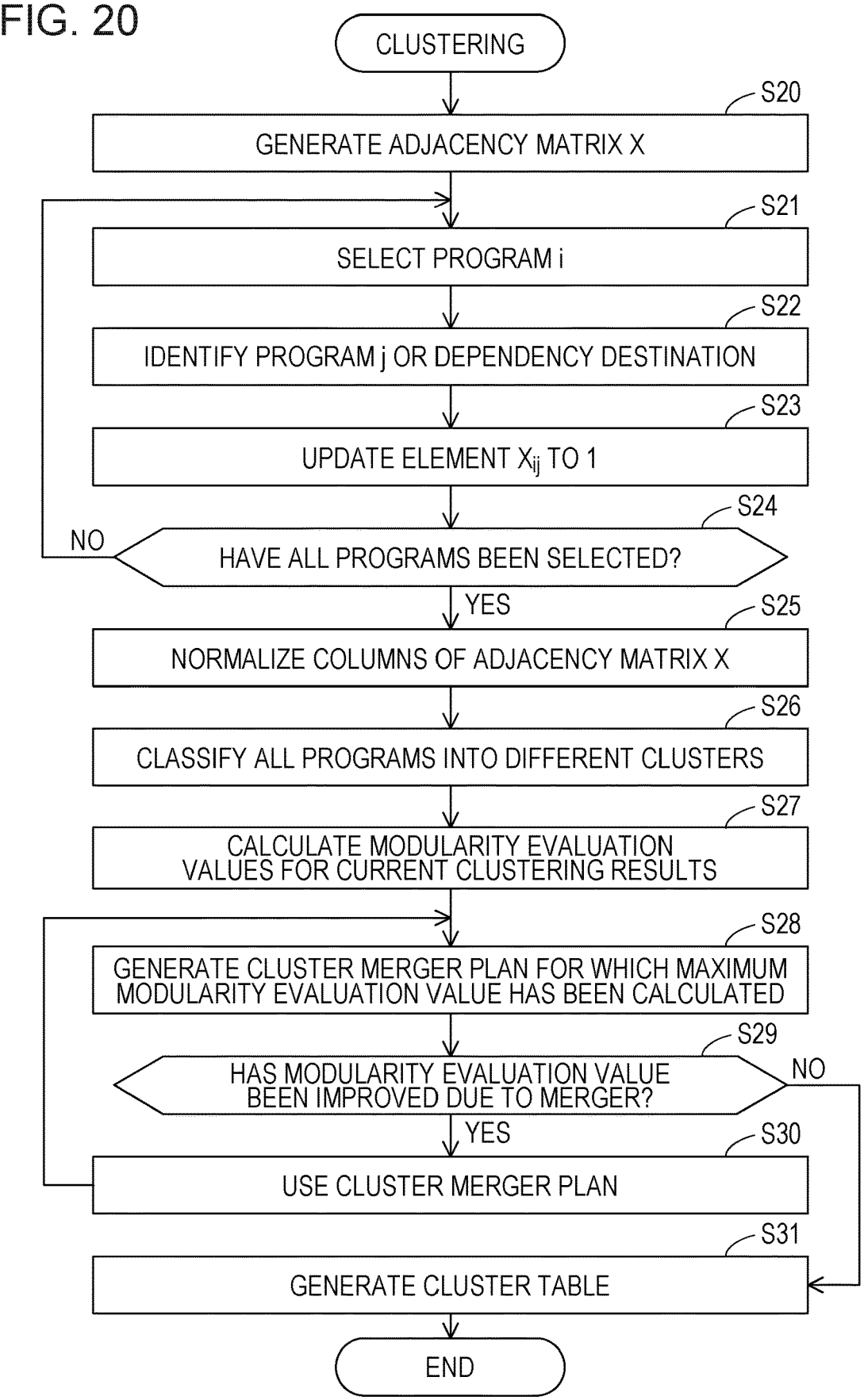
FIG. 20 is a flowchart of an example of a procedure for clustering.

FIG. 20 is a flowchart of an example of the procedure for the clustering. The clustering is executed in the aforementioned step S10. In step S20, the clustering section 125 counts the number (number of the classes) of the programs stored in the source code storage section 121. The clustering section 125 generates, as the empty adjacency matrix 133 (adjacency matrix X), a square matrix having sides indicating the number of the programs.

In step S21, the clustering section 125 selects a program i. In step S22, the clustering section 125 extracts a method call from the program i and identifies a program j that is a call destination or a destination on which the program i is dependent.

In step S23, the clustering section 125 updates, to "1", an element (element $X_{ij}$) indicated in an i-th row and a j-th column within the adjacency matrix 133 generated in step S20. In step S24, the clustering section 125 determines whether all the programs have been selected in step S21. If all the programs have been selected in step S21, the process proceeds to step S25. If a program among all the programs has yet to be selected, the process returns to step S21.

In step S25, the clustering section 125 normalizes each of the columns of the adjacency matrix 133. Specifically, the clustering section 125 counts a number (K) of elements indicating "1" for each of the columns of the adjacency matrix 133 and updates, for each of the columns, elements indicating "1" in the column to 1/K.

In step S26, the clustering section 125 generates, as temporal clusters, clusters with number corresponding to the number of the programs and classifies all the programs into the different clusters. In step S27, the clustering section 125 uses the aforementioned Equation (1) to calculate a modularity evaluation value Q for the clustering results obtained in step S26.

In step S28, the clustering section 125 selects two clusters from among the current clustering results and generates a cluster merger plan of merging the two clusters. The clustering section 125 calculates a modularity evaluation value Q for the case where the generated cluster merger plan is used. The clustering section 125 repeats the generation of a cluster merger plan and the calculation of a modularity evaluation value Q for each of selection patterns for selecting two clusters from among the current clustering results and identifies a cluster merger plan for which the maximum modularity evaluation value Q has been calculated.

In step S29, the clustering section 125 determines whether or not the modularity evaluation value Q calculated for the cluster merger plan identified in step S28 has been improved, compared with the modularity evaluation value Q calculated for the current clustering results (for example, whether or not the former modularity evaluation value Q is larger than the latter modularity evaluation value Q). If the modularity evaluation value Q has been improved, the process proceeds to step S30. If the modularity evaluation value Q has not been improved, the process proceeds to step S31.

In step S30, the clustering section 125 uses the cluster merger plan identified in step S28 to merge the two clusters. Then, the clustering section 125 treats clustering results after the merger as the current clustering results, and the process proceeds to step S28.

In step S31, the clustering section 125 does not use the cluster merger plan identified in step S28 and determines the current clustering results. The clustering section 125 generates the cluster table 142 in which the class names of the programs are associated with the cluster IDs.

Figure 21:
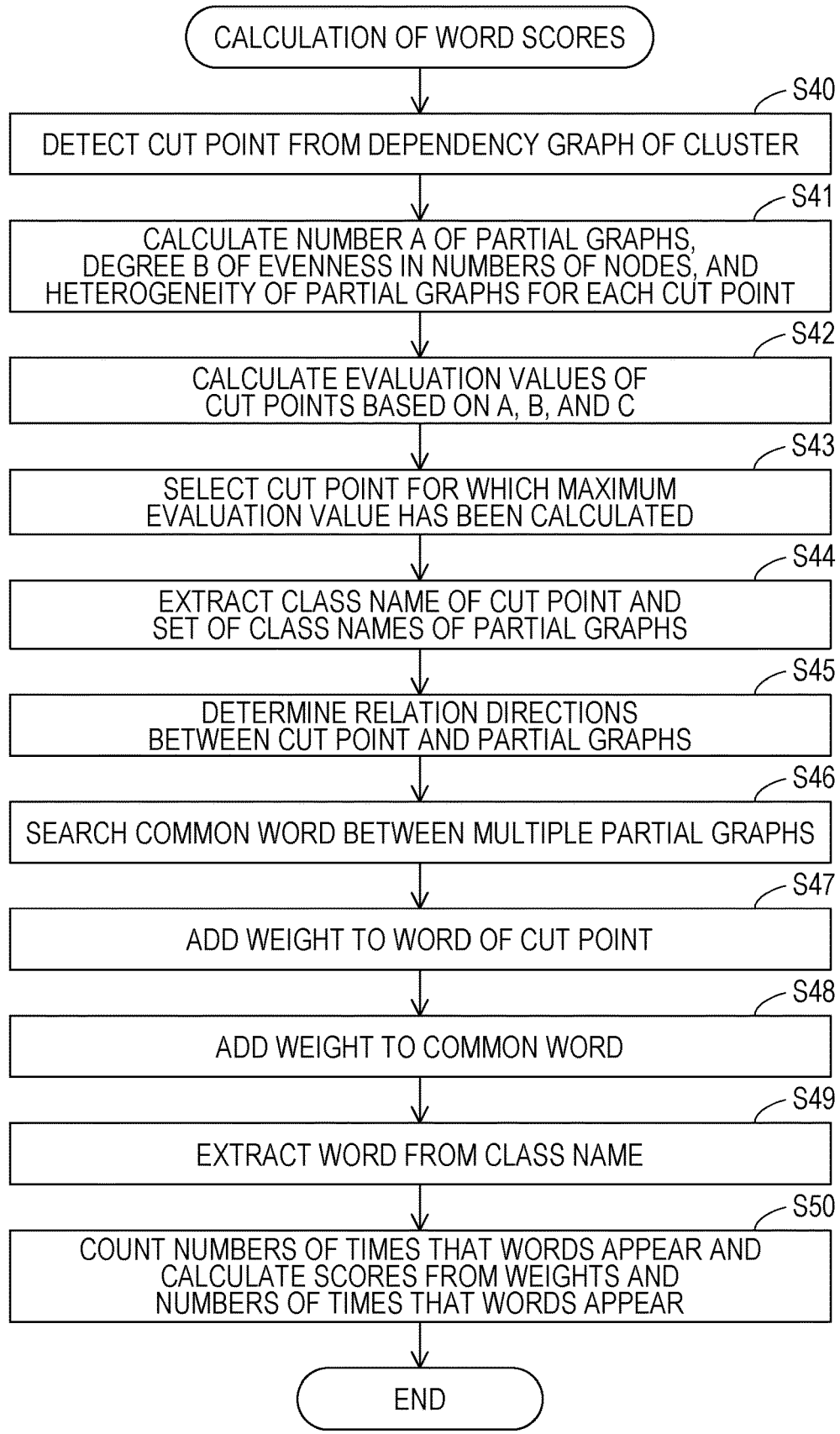
FIG. 21 is a flowchart of an example of a procedure for calculating word scores.

FIG. 21 is a flowchart of an example of the procedure for calculating the word scores. The word scores are calculated in the aforementioned step S11. The additional information generating section 126 executes the following steps S40 to S50 on each of the multiple clusters.

In step S40, the additional information generating section 126 acquires a dependency graph of a target cluster. As the dependency graph of the cluster, a portion of the entire dependency graph generated upon the clustering may be used. Alternatively, the additional information generating section 126 may analyze calling relationships between programs belonging to the cluster and generate the dependency graph. The additional information generating section 126 detects all cut points from the dependency graph of the cluster. Each of the cut points is a node satisfying a requirement that if the cut point is removed from the dependency graph, the dependency graph is divided into multiple disconnected partial graphs. For the detection of the cut points, a method described in the aforementioned John Hoperoft and Robert Tarjan, "Algorithm 447: Efficient Algorithms for Graph Manipulation", Communications of the ACM, Volume 16 Issue 6, pages 372-378, June 1973 may be used.

In step S41, the additional information generating section 126 calculates, for each of the cut points detected in step S40, a number A of partial graphs, the degree B of evenness in numbers of nodes, and the heterogeneity C of the partial graphs. The number A of the partial graphs is the number of the partial graphs generated in the case where the cut point is selected. The degree B of evenness in the numbers of the nodes is an index indicating a deviation in the numbers of the nodes between the partial graphs and is calculated by calculating <the number of the nodes of the dependency graph of the cluster>−(<the number of nodes of the largest partial graph>−<the number of nodes of the smallest partial graph>). The heterogeneity C of the partial graphs is an index indicating a degree at which nodes to which different package names have been added do not exist in each of the partial graphs, or the heterogeneity C of the partial graphs is the number of package names that among package names appearing in the cluster and occupy one or more partial graphs.

In step S42, the additional information generating section 126 uses preset weights $\alpha$, $\beta$, and $\gamma$, and A, B, and C calculated in step S41 to calculate an evaluation value $\alpha A+\beta B+\gamma C$ of each cut point. The additional information generating section 126 may calculate each of the evaluation values using only one or two of A, B, and C that are a number A of partial graphs, the degree B of evenness in numbers of nodes, and the heterogeneity C of the partial graphs.

In step S43, the additional information generating section 126 selects a cut point that is among the cut points detected in step S40 and for which the maximum evaluation value has been calculated in step S42. If the number of cut points detected in step S40 is 1, the calculation of A, B, and C in step S41 and the calculation of evaluation values in step S42 may be omitted. In addition, all cut points of which evaluation values exceed a threshold may be selected, or a predetermined number of cut points may be selected in descending order of evaluation value.

In step S44, the additional information generating section 126 extracts a class name from a program corresponding to the cut point selected in step S43 and registers the extracted class name in the cut point table 143. In addition, the additional information generating section 126 identifies multiple partial graphs to be generated in the case where the selected cut point is removed from the dependency graph. The additional information generating section 126 extracts a set of class names from programs corresponding to nodes belonging to the partial graphs and registers the extracted class names in the partial graph table 144.

In step S45, the additional information generating section 126 determines a relation direction for each of the partial graphs based on directions of edges existing between the selected cut point and nodes belonging to the partial graphs and registers the relation directions in the partial graph table 144. If an edge from a node within a partial graph to a cut point exists and an edge from the cut point to a node within the partial graph does not exist, a relation direction indicates "use". If an edge from a cut point to a node within a partial graph exists and an edge from a node within the partial graph to the cut point does not exist, a relation direction indicates "used". In cases other than the aforementioned cases, a relation direction indicates "mutual".

In step S46, the additional information generating section 126 extracts, for each of the multiple partial graphs, words from class names of programs corresponding to nodes belonging to the partial graph. The additional information generating section 126 searches a word commonly extracted from a predetermined percent or more of all the partial graphs (for example, more than half of all the partial graphs), and if the word exists, the additional information generating section 126 registers the extracted word as a common word in the cut point table 143.

In step S47, the additional information generating section 126 extracts a word from the class name of the cut point registered in the cut point table 143, adds a predetermined weight (of, for example, 5.0) to the extracted word of the cut point, and registers the word and the weight in the word weight table 145.

In step S48, if the common word is already registered in the cut point table 143, the additional information generating section 126 adds a predetermined weight (of, for example, 2.0) to the common word and registers the common word and the predetermined weight in the word weight table 145. It is preferable that the weight of the common word be smaller than the weight of the cut point. If the common word is included in the class name of the cut point, the additional information generating section 126 adds the weight of the cut point to the word on a priority basis and does not add the weight of the common word to the word.

In step S49, the additional information generating section 126 extracts words from class names of programs corresponding to nodes included in the cluster and registers the extracted words in the cluster word table 146. Words included in a class name including a package name are extracted based on a word dictionary prepared in advance, delimiters such as a dot and a hyphen, capital letters indicating initial letters of the words, and the like, for example.

In step S50, the additional information generating section 126 counts, from the cluster word table 146, the numbers of times that the words appear. The additional information generating section 126 calculates word scores by multiplying the numbers of times that the words appear by weights registered in the word weight table 145 and registers the calculated word scores in the word score table 147.

Figure 22:
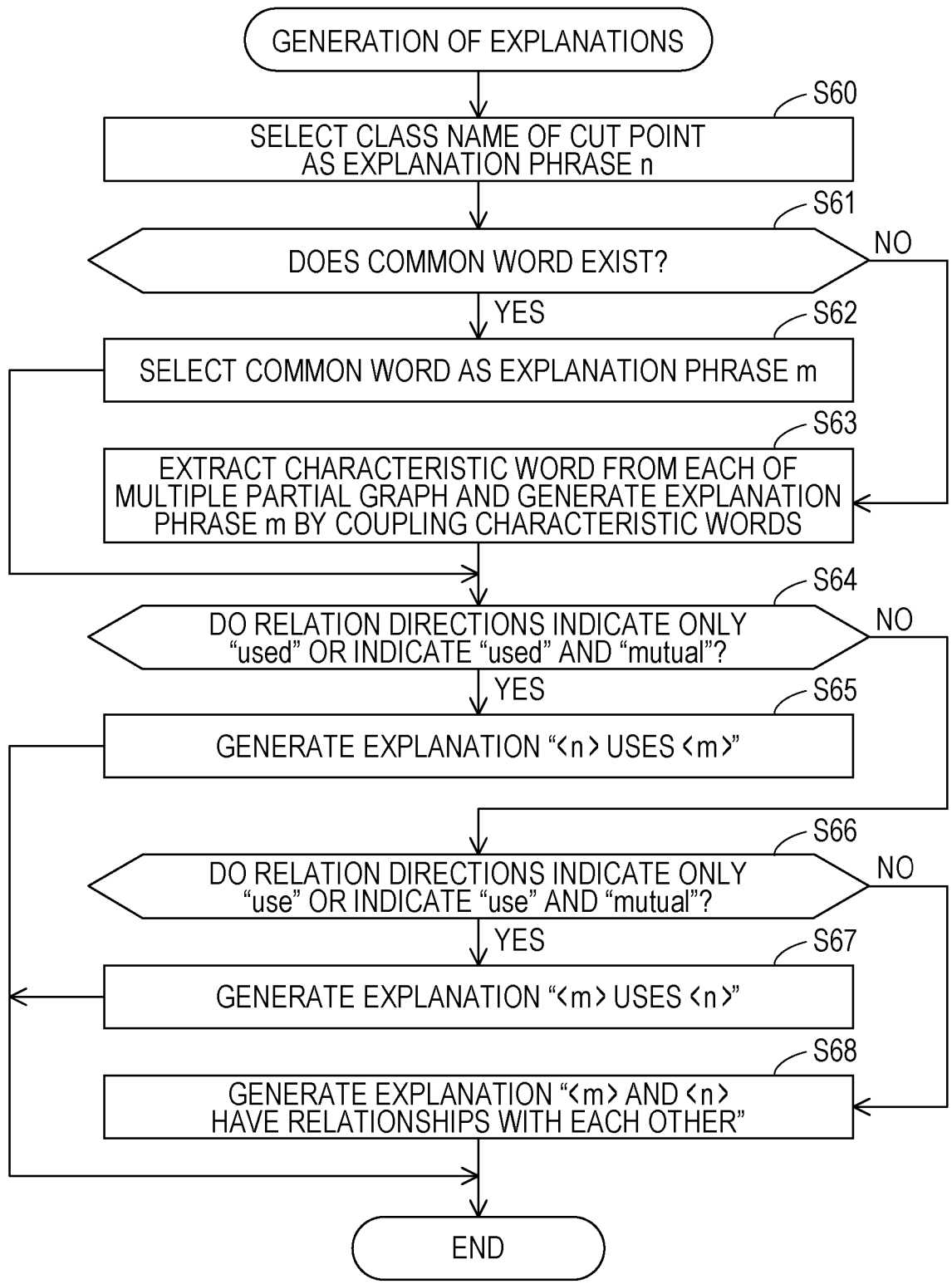
FIG. 22 is a flowchart of an example of a procedure for generating explanations.

FIG. 22 is a flowchart indicating an example of the procedure for generating the explanations. The explanations are generated in the aforementioned step S14. The additional information generating section 126 executes the following steps S60 to S68 on each of the multiple clusters.

In step S60, the additional information generating section 126 selects, as an explanation phrase n, a class name of a cut point registered in the cut point table 143. In step S61, the additional information generating section 126 determines whether or not a common word exists in a cluster or whether or not the common word is already registered in the cut point table 143. If the common word exists, the process proceeds to step S62. If the common word does not exist, the process proceeds to step S63.

In step S62, the additional information generating section 126 selects, as an explanation phrase m, the common word registered in the cut point table 143. Then, the process proceeds to step S64. In step S63, the additional information generating section 126 extracts a characteristic word from each of multiple partial graphs and generates, as the explanation phrase m, a character string obtained by coupling the extracted multiple characteristic words. For example, the additional information generating section 126 calculates tf-idf values of words for each of the partial graphs within the cluster and extracts, as a characteristic word for each of the partial graphs, a word for which the maximum tf-idf value has been calculated. As a tf value, the number of times that a word appears in a partial graph may be used. As an idf value, the reciprocal of the ratio of the number of partial graphs in which the word appears to the number of all the partial graphs or <the number of all the partial graphs>/<the number of the partial graphs including the word) may be used. A tf-idf value is a product of the tf value and the idf value.

In step S64, the additional information generating section 126 searches relation directions of the partial graphs within the cluster from the partial graph table 144 and determines whether the relation directions indicate only "used" or both "used" and "mutual". If the relation directions satisfy this requirement or indicate only "used" or both "used" and "mutual", the process proceeds to step S65. If the relation directions do not satisfy this requirement, the process proceeds to step S66.

In step S65, the additional information generating section 126 generates, as an explanation, a character string "<the explanation phrase n> uses <the explanation phrase m>" and registers the explanation in the additional information table 148. In step S66, the additional information generating section 126 determines whether the relation directions indicate only "use" or both "use" and "mutual". If the relation directions satisfy this requirement or indicate only "use" or both "use" and "mutual", the process proceeds to step S67. If the relation directions do not satisfy this requirement, the process proceeds to step S68.

In step S67, the additional information generating section 126 generates, as an explanation, a character string "<the explanation phrase m> uses <the explanation phrase n>" and registers the explanation in the additional information table 148. In step S68, the additional information generating section 126 generates, as an explanation, a character string "<the explanation phrase m> and <the explanation phrase n> have relationships with each other" and registers the explanation in the additional information table 148.

The analyzing device 100 according to the second embodiment selects a cut point serving as the center of a dependency graph of a cluster and adds the large weight to a word included in a class name of a program corresponding to the cut point. In addition, the analyzing device 100 detects a common word commonly appearing in partial graphs arranged in the vicinity of the selected cut point and adds the other large weight to the common word. Then, the analyzing device 100 selects characteristic words indicating characteristics of the cluster based on the added weights and generates a label including the characteristic words. Thus, the appropriate label in which the structure of the cluster is reflected is generated and the accuracy of the label is improved.

For example, if characteristic words are selected only based on appearance frequencies of words within a cluster, an appearance frequency of a word included only in a program corresponding to a cut point is low, regardless of the fact that the program corresponding to the cut point has an important role, and the word is hardly selected as a characteristic word. On the other hand, in the second embodiment, words included in a program corresponding to a cut point are prioritized, and words important to a cluster may be easily selected.

In addition, relationships between a program corresponding to a cut point and programs corresponding to partial graphs arranged in the vicinity of the cut point are simply represented using a class name of the cut point and a common word of the partial graphs arranged in the vicinity of the cut point. Due to the simple representation, a role of the program corresponding to the cut point and the structure of a cluster may be easily understood. Thus, the usability of visualized information indicating clustering results is improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
    a memory that stores cluster information indicating multiple programs belonging to a cluster; and
    a processor coupled to the memory, and processor is configured to:
        acquires a graph including multiple nodes corresponding to the multiple programs indicated by the cluster information and multiple edges indicating dependencies between the multiple programs, the dependencies between the multiple programs include calling relationships between the programs or inheritance relationships between the programs, and the cluster information is derived from an evaluation of an adjacency matrix that is generated based on the dependencies between the multiple programs,
        selects, from among the multiple nodes, a cut node that is arranged so that when the cut node is removed from the graph, the graph is divided into multiple disconnected partial graphs,
        extracts a word used in a program corresponding to the cut node among the multiple programs,
        uses the extracted word to generate additional information to be associated with the cluster; and
        generates a software map that includes the cluster information and the additional information to provide a visualization of a structure of a software that includes the multiple programs for usefulness of maintenance or improvement of the software.

2. The information processing device according to claim 1,
    wherein in the generation of the additional information, the processor adds a larger weight to the extracted word than weights of words used in other programs and selects a characteristic word to be used in the additional information from among multiple words used in the multiple programs based on appearance frequencies and the weights.

3. The information processing device according to claim 1,
    wherein the processor extracts a common word commonly used in different programs corresponding to different nodes included in different partial graphs among the multiple partial graphs, and
    wherein the additional information is generated using the extracted word and the common word.

4. The information processing device according to claim 1,
    wherein the graph is a directed graph in which the multiple edges indicate directions, respectively,
    wherein the processor determines directions of dependencies between the cut point and the multiple partial graphs based on the graph, and
    wherein in the generation of the additional information, the processor generates the additional information using the extracted word and phrases corresponding to the determined directions of the dependencies.

5. The information processing device according to claim 1,
    wherein in the selection of the cut node, when multiple candidate cut nodes exist in the graph, the processor selects, from among the candidate cut nodes on a priority basis, a candidate cut node that is arranged so that when the candidate cut node is removed from the graph, the number of disconnected partial graphs into which the graph is divided is the largest.

6. The information processing device according to claim 1,
    wherein in the selection of the cut node, when multiple candidate cut nodes exist in the graph, the processor selects, from among the candidate cut nodes on a priority basis, a candidate cut node that is arranged so that when the candidate cut node is removed from the graph, a deviation in numbers of nodes between partial graphs into which the graph is divided is the smallest.

7. The information processing device according to claim 1,
    wherein hierarchical classification names are added to the multiple programs, respectively, and
    wherein in the selection of the cut node, when multiple candidate cut nodes exist in the graph, the processor selects, from among the candidate cut nodes on a priority basis, a candidate cut node that is arranged so that when the candidate cut node is removed from the graph, the number of partial graphs that are among partial graphs into which the graph is divided and each include nodes corresponding to programs to which different classification names have been added is the smallest.

8. An information processing method to be executed by a computer, comprising:
    acquiring a graph including multiple nodes corresponding to multiple programs belonging to a cluster and multiple edges indicating dependencies between the multiple programs, the dependencies between the multiple programs include calling relationships between the programs or inheritance relationships between the programs, and the cluster information is derived from an evaluation of an adjacency matrix that is generated based on the dependencies between the multiple programs;
    selecting, from among the multiple nodes, a cut node that is arranged so that when the cut node is removed from the graph, the graph is divided into multiple disconnected partial graphs;
    extracting a word used in a program corresponding to the cut node among the multiple programs and using the extracted word to generate additional information to be associated with the cluster; and
    generating a software map that includes the cluster information and the additional information to provide a visualization of a structure of a software that includes the multiple programs for usefulness of maintenance or improvement of the software.

9. A non-transitory, computer-readable recording medium having stored therein a program for causing a computer to execute a process, the process comprising:

acquiring a graph including multiple nodes corresponding to multiple programs belonging to a cluster and multiple edges indicating dependencies between the multiple programs the dependencies between the multiple programs include calling relationships between the programs or inheritance relationships between the programs, and the cluster information is derived from an evaluation of an adjacency matrix that is generated based on the dependencies between the multiple programs;

selecting, from among the multiple nodes, a cut node that is arranged so that when the cut node is removed from the graph, the graph is divided into multiple disconnected partial graphs;

extracting a word used in a program corresponding to the cut node among the multiple programs and using the extracted word to generate additional information to be associated with the cluster; and generating a software map that includes the cluster information and the additional information to provide a visualization of a structure of a software that includes the multiple programs for usefulness of maintenance or improvement of the software.

* * * * *